US011620521B2

(12) United States Patent
Karras et al.

(10) Patent No.: US 11,620,521 B2
(45) Date of Patent: Apr. 4, 2023

(54) SMOOTHING REGULARIZATION FOR A GENERATIVE NEURAL NETWORK

(71) Applicant: NVIDIA Corporation, Santa Clara, CA (US)

(72) Inventors: Tero Tapani Karras, Helsinki (FI); Samuli Matias Laine, Vantaa (FI); Jaakko T. Lehtinen, Helsinki (FI); Miika Samuli Aittala, Helsinki (FI); Janne Johannes Hellsten, Helsinki (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 185 days.

(21) Appl. No.: 17/160,648

(22) Filed: Jan. 28, 2021

(65) Prior Publication Data
US 2021/0150357 A1    May 20, 2021

Related U.S. Application Data

(63) Continuation-in-part of application No. 16/418,317, filed on May 21, 2019, now Pat. No. 11,455,790.

(60) Provisional application No. 62/990,012, filed on Mar. 16, 2020, provisional application No. 62/767,985, filed on Nov. 15, 2018, provisional application No. 62/767,417, filed on Nov. 14, 2018.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ............ G06N 3/02; G06N 3/08; G06N 3/04
See application file for complete search history.

(56) References Cited

U.S. PATENT DOCUMENTS

| 10,824,940 B1* | 11/2020 | Rybakov | G06N 3/08 |
| 2010/0138026 A1* | 6/2010 | Kaushal | G06N 5/04 |
| | | | 706/23 |

(Continued)

OTHER PUBLICATIONS

Achille, A., et al., "On the emergence of invariance and disentangling in deep representations," CoRR, Journal of Machine Learning Research 19(2018) 1-34.

Bau, D., et al., "Visualizing and understanding generative adversarial networks," Submitted to the ICLR 2019, https://openview.net/forum?id=Hyg_x2C5FX, 2018.

(Continued)

*Primary Examiner* — Tuan H Nguyen
(74) *Attorney, Agent, or Firm* — Leydig, Voit & Mayer, Ltd.

(57) ABSTRACT

A style-based generative network architecture enables scale-specific control of synthesized output data, such as images. During training, the style-based generative neural network (generator neural network) includes a mapping network and a synthesis network. During prediction, the mapping network may be omitted, replicated, or evaluated several times. The synthesis network may be used to generate highly varied, high-quality output data with a wide variety of attributes. For example, when used to generate images of people's faces, the attributes that may vary are age, ethnicity, camera viewpoint, pose, face shape, eyeglasses, colors (eyes, hair, etc.), hair style, lighting, background, etc. Depending on the task, generated output data may include images, audio, video, three-dimensional (3D) objects, text, etc.

20 Claims, 26 Drawing Sheets

(56) References Cited

U.S. PATENT DOCUMENTS

| | | |
|---|---|---|
| 2010/0303162 A1 | 12/2010 | Wang et al. |
| 2019/0244106 A1 | 8/2019 | Franca-Neto |
| 2020/0126584 A1* | 4/2020 | Huang ............... G06F 40/30 |

OTHER PUBLICATIONS

Ben-Yosef, M., et al., "Gaussian mixture generative adversarial networks for diverse datasets, and the unsupervised clustering of images," CoRR, abs/1808.10356 (2018).

Brock, A., et al., "Large scale GAN training for high fidelity natural image synthesis," CoRR, abs/1809.11096 (2018).

Chen, T., On self modulation for generative adversarial networks, CoRR, abs/1810.01365 (2018).

Chen, T.Q., et al., "Isolating sources of disentanglement in variational autoencoders," CoRR, abs/1802.04942 (2018).

Chen, X., et al., "InfoGAN: interpretable representation learning by information maximizing generative adversarial nets," CoRR, abs/1606.03657 (2016).

Denton, E.L., et al., "Deep generative image models using a Laplacian pyramic of adversarial networks," CoRR, abs/1506.05751 (2015).

Desjardins, G., et al., Disentangling factors of variation via generative entangling, CoRR, abs/1210.5474 (2012).

Donahue, J., et al., "Adversarial feature learning," CoRR, abs/1605.09782 (2016).

Dosovitskiy, J.T., et al., Learning to generate chairs with convolutional neural networks, CoRR, abs/1411.5928 (2014).

Drucker, H., et al., "Improving generalization performance using double backpropagation," IEEE Transactions on Neural Networks, 3(6):991-997 (1992).

Dumoulin, V., et al., "Adversarially learned inference," in Proc. ICLR (2017).

Durugkar, I.P., et al., "Generative multi-adversarial networks," CoRR, abs/1611.01673 (2016).

Eastwood, C., et al., "A framework for the quantitative evaluation of disentangled representations," in Proc. ICLR (2018).

Gatys, L.A., et al., "Image style transfer using convolutional neural networks," in Proc. CVPR (2016).

Goodfellow, I., et al., "Generative Adversarial Networks," in NIPS (2014).

Guan-Yuan Ho, W.S., et al., "MIXGAN: learning concepts from different domains for mixture generation," CoRR, abs/1807.01659 (2018).

Gulrajani, I., et al., "Improved training of Wasserstein GANs," CoRR, abs/1704.00028 (2017).

Heusel, M., et al., "GANs trained by a two time-scale update rule converge to a local Nash equilibrium," in NIPS, pp. 6626-6637 (2017).

Higgins, I., et al., "beta-vae: Learning basic visual concepts with a constrained variational framework," in Proc. ICLR (2017).

Huang, X., et al., "Arbitrary style transfer in real-time with adaptive instance normalization," CoRR, abs/1703.06868 (2017).

Huang, X., et al., "Multimodal unsupervised image-to-image translation," CoRR, abs/1804.04732 (2018).

Karras, T., et al., "Progressive growing of GANs for improved quality, stability and variation," CoRR, abs/1710.10196 (2017).

Kim, H., et al., "Disentangling by factorising," In Proc. ICML (2018).

Kingma, D.P., et al., "Glow: Generative flow with invertible 1x1 convolutions," CoRR, abs/1807.03039 (2018).

Kingma, D.P., et al., "Auto-encoding variational bayes," In ICLR (2014).

Kurach, K., et al., "The gan landscape: Losses, architectures, regularization, and normalization," CoRR, abs/1807.04720 (2018).

Laine, S., et al., "Feature-based metrics for exploring the latent space of generative models," Technical report (2018).

Li, Y., et al., "Demystifying neural style transfer," CoRR, abs/1701.01036 (2017).

Lucic, M., et al., "Are GANs created equal? A large-scale study," CoRR, abs/1711.10337 (2017).

Matthey, L., et al., "Disentanglement testing sprites dataset," found at: https://github.com/deepmind/dsprites-dataset/ (2017).

Mescheder, L., et al., "Which training methods for GANs do actually converge?" CoRR, abs/1801.04406 (2018).

Miyato, T., et al., "Spectral normalization for generative adversarial networks," CoRR, abs/1802.05957 (2018).

Miyato, T. et al., "cGANs with projection discriminator," CoRR, abs/1802.05637 (2018).

Mordido, G., et al., "Dropout-gan: Learning from a dynamic ensemble of discriminators," CoRR, abs/1807.11346 (2018).

Mukherfee, S., et al., "Cluster-GAN: Latent space clustering in generative adversarial networks, CoRR, abs/1809.03627 (2018).

Rezende, D.J., et al., "Stochastic backpropagation and approximate inference in deep generative models," in Proc. ICML (2014).

Ridgeway, K., "A survey of inductive biases for factorial representation-learning," CoRR, abs/1612.05299 (2016).

Ross, A.S., et al., "Improving the adversarial robustness and interpretability of deep neural networks by regularizing their input gradients," CoRR, abs/1711.09404 (2017).

Sainburg, T., et al., "Generative adversarial interpolative autoencoding: adversarial training on latent space interpolations encourage convex latest distributions," CoRR abs/1807.06650 (2018).

Salimans, T., et al., "Improved techniques fortraining GANs," in NIPS, (2016).

Schmidhuber, J., "Learning factorial codes by predictability minimization," Neural Computation, 4(6):863-879 (1992).

Sharma, R., et al., "Improved training with curriculum gans," CoRR, abs/1807.09295 (2018).

Shoemake, K., "Animating rotation with quaternion curves," in Proc. SIGGRAPH'85 (1985).

Simonyan, K., et al., "Very deep convolutional networks for large-scale image recognition," CoRR, abs/1409.1556 (2014).

Wang, T., et al., "High-resolution image synthesis and semantic manipulation with conditional GANs," CoRR, abs/1711.11585 (2017).

White, T., "Sampling generative networks: Notes on a few effective techniques," CoRR abs/1609.04468 (2016).

Zhang, H., et al., "Self-attention generative adversarial networks," CoRR, abs/1805.08318 (2018).

Zhang, R., et al., "The unreasonable effectiveness of deep features as a perceptual metric," in Proc. CVPR (2018).

Abadi, M., et al., "TensorFlow: a system for large-scale machine learning," in Proc. 12th USENIX Conference on Operating Systems Designs and Implementation, OSDI'16, pp. 265-283 (2016).

Kingma, D.P., et al., "A method for stochastic optimization," in ICLR (2015).

* cited by examiner

SMOOTHING REGULARIZATION FOR A GENERATIVE NEURAL NETWORK

CLAIM OF PRIORITY

This application is a continuation-in-part of U.S. patent application Ser. No. 16/418,317 titled "A Style-Based Architecture For Generative Neural Networks," filed May 21, 2019 which claims the benefit of U.S. Provisional Application No. 62/767,417 titled "A Style-Based Architecture For Generative Neural Networks," filed Nov. 14, 2018 and U.S. Provisional Application No. 62/767,985 titled "A Style-Based Architecture For Generative Neural Networks," filed Nov. 15, 2018, the entire contents of these applications is incorporated herein by reference. This application also claims the benefit of U.S. Provisional Application No. 62/990,012 titled "A Style-Based Architecture For Generative Neural Network for Improved Image Quality," filed Mar. 16, 2020, the entire contents of which is incorporated herein by reference.

TECHNICAL FIELD

The present invention relates to neural networks, and in particular, to a generator architecture for synthesizing data using scale-specific controls.

BACKGROUND

The resolution and quality of images produced by generative adversarial networks (GAN) has improved recently. Yet GANs continue to operate as black boxes, and despite recent efforts, the understanding of various aspects of the image synthesis process, e.g., the origin of stochastic features, is still lacking. The properties of the latent space are also poorly understood, and the commonly demonstrated latent space interpolations provide no quantitative way to compare different GANs against each other. There is a need for addressing these issues and/or other issues associated with the prior art.

SUMMARY

A style-based generative network architecture enables scale-specific control of synthesized output data, such as images. During training, the style-based generative neural network (generator neural network) includes a mapping network and a synthesis network. During prediction, the mapping network may be omitted, replicated, or evaluated several times. The synthesis network may be used to generate highly varied, high-quality output data with a wide variety of attributes. For example, when used to generate images of people's faces, the attributes that may vary are age, ethnicity, camera viewpoint, pose, face shape, eyeglasses, colors (eyes, hair, etc.), hair style, lighting, background, etc. Depending on the task, generated output data may include images, audio, video, three-dimensional (3D) objects, text, etc.

A method, computer readable medium, and system are disclosed for synthesizing output data using a mapping neural network and a synthesis neural network. A latent code defined in an input space is processed by the mapping neural network to produce an intermediate latent code defined in an intermediate latent space. The intermediate latent code is converted into a first style signal. The first style signal is applied at a first layer of the synthesis neural network to modify first intermediate data according to the first style signal to produce modified first intermediate data. In an embodiment, the intermediate latent code is a vector that is converted into the first style signal via an affine transformation. The modified first intermediate data is processed to produce second intermediate data and a second style signal is applied at a second layer of the synthesis neural network to modify the second intermediate data, according to the second style signal, to produce second modified intermediate data. In an embodiment, the intermediate latent code is a combination of the first and second style signals and a portion of the intermediate latent code is extracted to produce the first and/or second style signal. In an embodiment, the intermediate latent code is converted into the second style signal via an affine transformation. In an embodiment, a second latent code defined in the input space is processed by the mapping neural network to produce a second intermediate latent code defined in the intermediate latent space and the second intermediate latent code is converted into the second style signal. In an embodiment, the modified first intermediate data is processed by subsequent layers, such as a 3×3 convolutional layer, to produce the second intermediate data. The second intermediate data is processed to produce output data comprising content corresponding to the second intermediate data.

A method, computer readable medium, and system are disclosed for synthesizing output data using a synthesis neural network. A first set of spatial noise is applied at a first layer of the synthesis neural network to generate modified first intermediate data comprising content corresponding to the first intermediate data that is modified based on the first set of spatial noise. The modified first intermediate data is processed to produce second intermediate data and a second set of spatial noise is applied at a second layer of the synthesis neural network to generate modified second intermediate data comprising content corresponding to the second intermediate data that is modified based on the second set of spatial noise. The modified second intermediate data is processed to produce output data comprising content corresponding to the second intermediate data.

DETAILED DESCRIPTION

A style-based generative network architecture enables scale-specific control of the synthesized output. A style-based generator system includes a mapping network and a synthesis network. Conceptually, in an embodiment, feature maps (containing spatially varying information representing content of the output data, where each feature map is one channel of intermediate activations) generated by different layers of the synthesis network are modified based on style control signals provided by the mapping network. The style control signals for different layers of the synthesis network may be generated from the same or different latent codes. A latent code may be a random N-dimensional vector drawn from e.g. a Gaussian distribution. The style control signals for different layers of the synthesis network may be generated from the same or different mapping networks. Additionally, spatial noise may be injected into each layer of the synthesis network.

Figure 1A:
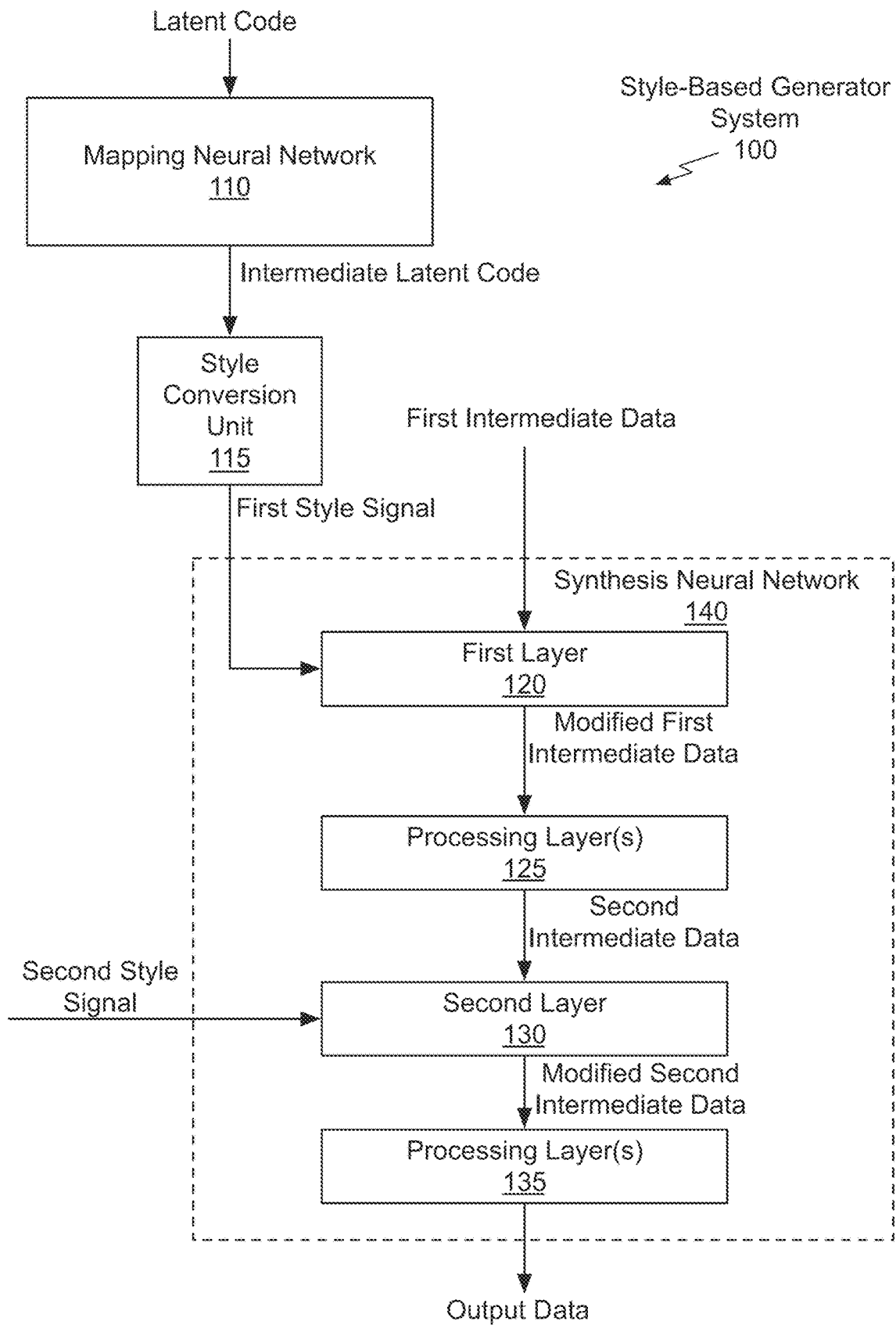
FIG. 1A illustrates a block diagram of a style-based generator system, in accordance with an embodiment.

FIG. 1A illustrates a block diagram of a style-based generator system 100, in accordance with an embodiment. The style-based generator system 100 includes a mapping neural network 110, a style conversion unit 115, and a synthesis neural network 140. After the synthesis neural network 140 is trained, the synthesis neural network 140 may be deployed without the mapping neural network 110 when the intermediate latent code(s) and/or the style signals produced by the style conversion unit 115 are pre-computed. In an embodiment, additional style conversion units 115 may be included to convert the intermediate latent code generated by the mapping neural network 110 into a second style signal or to convert a different intermediate latent code into the second style signal. One or more additional mapping neural networks 110 may be included in the style-based generator system 100 to generate additional intermediate latent codes from the latent code or additional latent codes.

The style-based generator system 100 may be implemented by a program, custom circuitry, or by a combination of custom circuitry and a program. For example, the style-based generator system 100 may be implemented using a GPU (graphics processing unit), CPU (central processing unit), or any processor capable of performing the operations described herein. Furthermore, persons of ordinary skill in the art will understand that any system that performs the operations of the style-based generator system 100 is within the scope and spirit of embodiments of the present invention.

Conventionally, a latent code is provided to a generator through an input layer, such as the first layer of a feedforward neural network. In contrast, in an embodiment, instead of receiving the latent code, the synthesis neural network 140 starts from a learned constant and the latent code is input to the mapping neural network 110. In an embodiment, the first intermediate data is the learned constant. Given a latent code z in the input latent space $\mathcal{Z}$, a non-linear mapping network $f: \mathcal{Z} \to \mathcal{W}$ first produces intermediate latent code $w \in \mathcal{W}$. The mapping neural network 110 may be configured to implement the non-linear mapping network. In an embodiment, the dimensions of input and output activations in the input latent space $\mathcal{Z}$ and the intermediate latent space $\mathcal{W}$ are equal (e.g., 512). In an embodiment, the mapping function $f$ is implemented using an 8-layer MLP (multilayer perceptron, i.e., a neural network consisting of only fully-connected layers).

While the conventional generator only feeds the latent code though the input layer of the generator, the mapping neural network 110 instead maps the input latent code z to the intermediate latent space $\mathcal{W}$ to produce the intermediate latent code w. The style conversion unit 115 converts the intermediate latent code w into a first style signal. One or more intermediate latent codes w are converted into spatially invariant styles including the first style signal and a second style signal. In contrast with conventional style transfer techniques, the spatially invariant styles are computed from a vector, namely the intermediate latent code w, instead of from an example image. The one or more intermediate latent codes w may be generated by one or more mapping neural networks 110 for one or more respective latent codes z. The synthesis neural network 140 processes the first intermediate data (e.g., a learned constant encoded as a feature map) according to the style signals, for example, increasing density of the first intermediate data from 4×4 to 8×8 and continuing until the output data density is reached.

In an embodiment, the style conversion unit 115 performs an affine transformation. The style conversion unit 115 may be trained to learn the affine transformation during training of the synthesis neural network 140. The first style signal controls operations at a first layer 120 of the synthesis neural network 140 to produce modified first intermediate data. In an embodiment, the first style signal controls an adaptive instance normalization (AdaIN) operation within the first layer 120 of the synthesis network 140. In an embodiment, the AdaIN operation receives a set of content feature maps and a style signal and modifies the first-order statistics (i.e., the "style") of the content feature maps to match first-order statistics defined by the style signal. The modified first intermediate data output by the first layer 120 is processed by processing layer(s) 125 to generate second intermediate data. In an embodiment, the processing layer(s) 125 include a 3×3 convolution layer. In an embodiment, the processing layer(s) 125 include a 3×3 convolution layer followed by an AdaIN operation that receives an additional style signal, not explicitly shown in FIG. 1A.

The second intermediate data is input to a second layer 130 of the synthesis neural network 140. The second style signal controls operations at the second layer 130 to produce modified second intermediate data. In an embodiment, the first style signal modifies a first attribute encoded in the first intermediate data and the second style signal modifies a second attribute encoded in the first intermediate data and the second intermediate data. For example, the first intermediate data is coarse data compared with the second intermediate data and the first style is transferred to coarse feature maps at the first layer 120 while the second style is transferred to higher density feature maps at the second layer 130.

In an embodiment, the second layer 130 up-samples the second intermediate data and includes a 3×3 convolution layer followed by an AdaIN operation. In an embodiment, the second style signal controls an AdaIN operation within the second layer 130 of the synthesis network 140. The modified second intermediate data output by the second layer 130 is processed by processing layer(s) 135 to generate output data including content corresponding to the second intermediate data. In an embodiment, multiple (e.g., 32, 48, 64, 96, etc.) channels of features in the modified second intermediate data are converted into the output data that is encoded as color channels (e.g., red, green, blue).

In an embodiment, the processing layer(s) 135 includes a 3×3 convolution layer. In an embodiment, the output data is an image including first attributes corresponding to a first scale and second attributes corresponding to a second scale, where the first scale is coarser compared with the second scale. The first scale may correspond to a scale of the feature maps processed by the first layer 120 and the second scale may correspond to a scale of the feature maps processed by the second layer 130. Accordingly, the first style signal modifies the first attributes at the first scale and the second style signal modifies the second attributes at the second scale.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
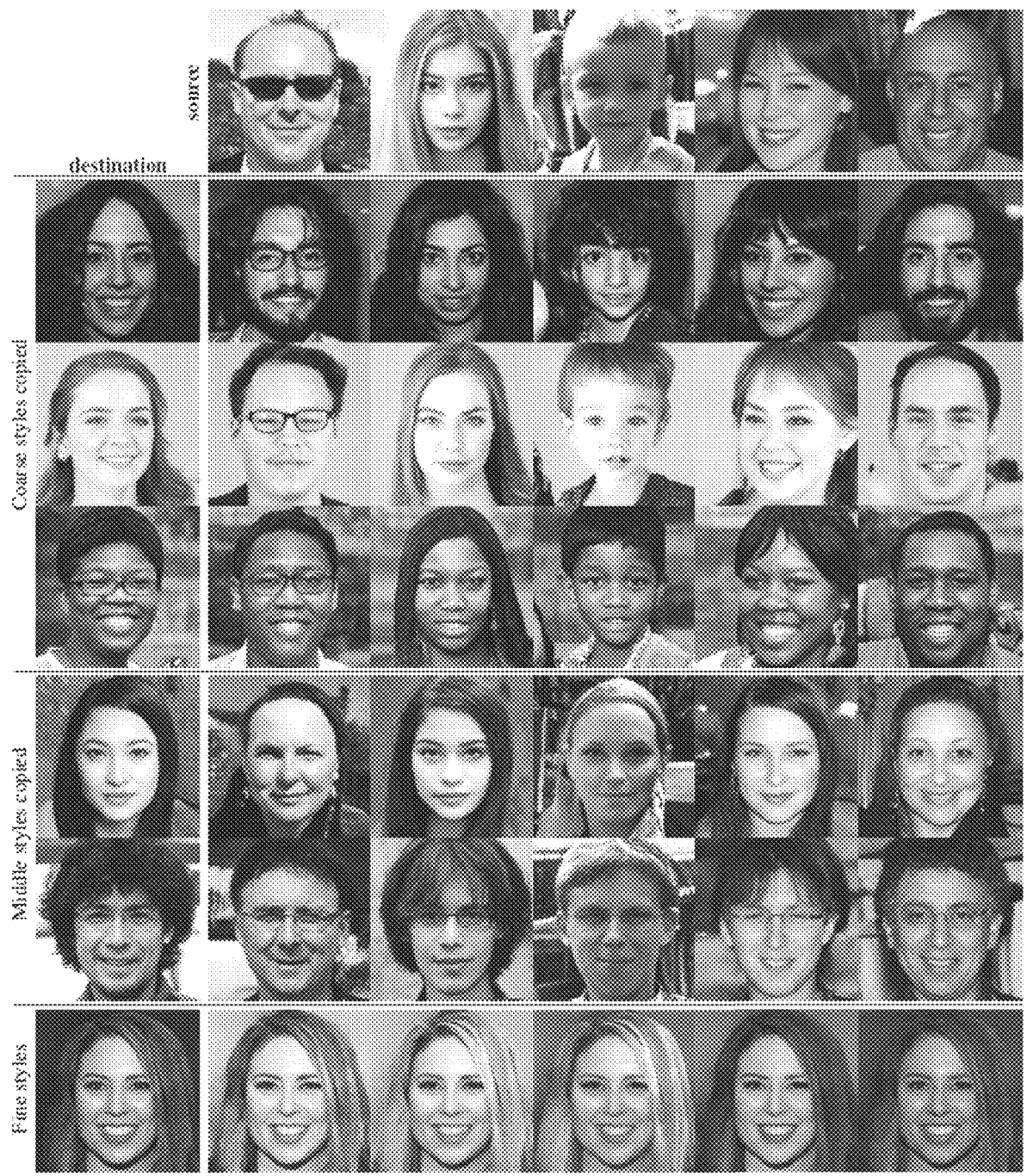
FIG. 1B illustrates images generated by the style-based generator system, in accordance with an embodiment.

FIG. 1B illustrates images generated by the style-based generator system 100, in accordance with an embodiment. The images are generated in $1024^2$ resolution. In other embodiments, the images can be generated at a different resolution. Two different latent codes are used to control the styles of images generated by the style-based generator system 100. Specifically, a first portion of the styles are produced by the mapping neural network 110 and a style conversion unit 115 from the "source" latent codes in the top row. A second portion of the styles are produced by the same or an additional mapping neural network 110 and a corresponding style conversion unit 115 from the "destination" latent codes in the leftmost column. The style-based generator system 100 starts from a learned constant input at the synthesis neural network 140 and adjusts the "style" of the image at each convolution layer based on the latent code, therefore directly controlling the strength of image attributes, encoded in feature maps, at different scales. In other words, a given set of styles from "source" data is copied to "destination" data. Thus, the copied styles (coarse, middle, or fine) are taken from the "source" data while all the other styles are kept the same as in the "destination" data.

The first portion of styles (destination) are applied by the synthesis neural network 140 to process the learned constant with a first subset of the first portion of styles replaced with a corresponding second subset of the second portion of the styles (source). In an embodiment, the learned constant is a 4×4×512 constant tensor. In the second, third, and fourth rows of images in FIG. 1B, the second portion of the styles (source) replaces the first portion of the styles (destination) at coarse layers of the synthesis neural network 140. In an embodiment, the coarse layers correspond to coarse spatial densities $4^2$-$8^2$. In an embodiment, high-level attributes such as pose, general hair style, face shape, and eyeglasses are copied from the source, while other attributes, such as all colors (eyes, hair, lighting) and finer facial features of the destination are retained.

In the fifth and sixth rows of images in FIG. 1B, second portion of the styles (source) replaces the first portion of the styles (destination) at middle layers of the synthesis neural network 140. In an embodiment, the middle layers correspond to spatial densities of $16^2$-$32^2$. Smaller scale facial features, hair style, eyes open/closed are inherited from the source, while the pose, general face shape, and eyeglasses from the destination are preserved. Finally, in the last row of images in FIG. 1B, the second portion of the styles (source) replaces the first portion of the styles (destination) at high density (fine) layers of the synthesis neural network 140. In an embodiment, the fine layers correspond to spatial densities of $64^2$-$1024^2$. Using the styles from the second portion of the styles (source) for the fine layers inherits the color scheme and microstructure from the source while preserving the pose and general face shape from the destination.

The architecture of the style-based generator system 100 enables control of the image synthesis via scale-specific modifications to the styles. The mapping network 110 and affine transformations performed by the style conversion unit 115 can be viewed as a way to draw samples for each style from a learned distribution, and the synthesis network 140 provides a mechanism to generate a novel image based on a collection of styles. The effects of each style are localized in the synthesis network 140, i.e., modifying a specific subset of the styles can be expected to affect only certain attributes of the image.

Using style signals from at least two different latent codes, as shown in FIG. 1B, is referred to as style mixing or mixing regularization. Style mixing during training decorrelates neighboring styles and enables more fine-grained control over the generated imagery. In an embodiment, during training a given percentage of images are generated using two random latent codes instead of one. When generating such an image, a random location (e.g., crossover point) in the synthesis neural network 140 may be selected where processing switches from using style signals generated using a first latent code to style signals generated using a second latent code. In an embodiment, two latent codes $z_1$, $z_2$ are processed by the mapping neural network 110, and the corresponding intermediate latent codes $w_1$, $w_2$ control the styles so that $w_1$ applies before the crossover point and $w_2$ after the crossover point. The mixing regularization technique prevents the synthesis neural network 140 from assuming that adjacent styles are correlated.

TABLE 1 shows how enabling mixing regularization during training may improve localization of the styles considerably, indicated by improved (lower is better) Fréchet inception distances (FIDs) in scenarios where multiple latent codes are mixed at test time. The images shown in FIG. 1B are examples of images synthesized by mixing two latent codes at various scales. Each subset of styles controls meaningful high-level attributes of the image.

TABLE 1

FIDs for different mixing regularization ratios

| Mixing ratio (training time) | Number of latent codes (test time) | | | |
|---|---|---|---|---|
| | 1 | 2 | 3 | 4 |
| 0% | 4.42 | 8.22 | 12.88 | 17.41 |
| 50% | 4.41 | 6.10 | 8.71 | 11.61 |
| 90% | 4.40 | 5.11 | 6.88 | 9.03 |
| 100% | 4.83 | 5.17 | 6.63 | 8.40 |

The mixing ratio indicates that percentage of training examples for which mixing regularization is enabled. A maximum of four different latent codes were randomly selected during test time and the crossover points between the different latent codes were also randomly selected. Mixing regularization improves the tolerance to these adverse operations significantly.

As confirmed by the FIDs, the average quality of the images generated by the style-based generator system 100 is high, and even accessories such as eyeglasses and hats are successfully synthesized. For the images shown in FIG. 1B, sampling from the extreme regions of $\mathcal{W}$ is avoided by using the so-called truncation trick that can be performed in $\mathcal{W}$ instead of $\mathcal{Z}$. Note that the style-based generator system 100 may be implemented to enable application of the truncation selectively to low resolutions only, so that high-resolution details are not affected.

Considering the distribution of training data, areas of low density are poorly represented and thus likely to be difficult for the style-based generator system 100 to learn. Non-uniform distributions of training data present a significant open problem in all generative modeling techniques. However, it is known that drawing latent vectors from a truncated or otherwise shrunk sampling space tends to improve average image quality, although some amount of variation is lost. In an embodiment, to improve training of the style-based generator system 100, a center of mass of $\mathcal{W}$ is computed as $\overline{w}=\mathbb{E}_{z\sim P(z)}[f(z)]$. In the case of one dataset of human faces (e.g., FFHQ, Flickr-Faces-HQ), the point represents a sort of an average face ($\psi=0$). The deviation of a given w is scaled down from the center as $w'=\overline{w}+\psi(w-\overline{w})$, where $\psi<1$. In conventional generative modeling systems, only a subset of the neural networks are amenable to such truncation, even when orthogonal regularization is used, truncation in W space seems to work reliably even without changes to the loss function.

Figure 1C:
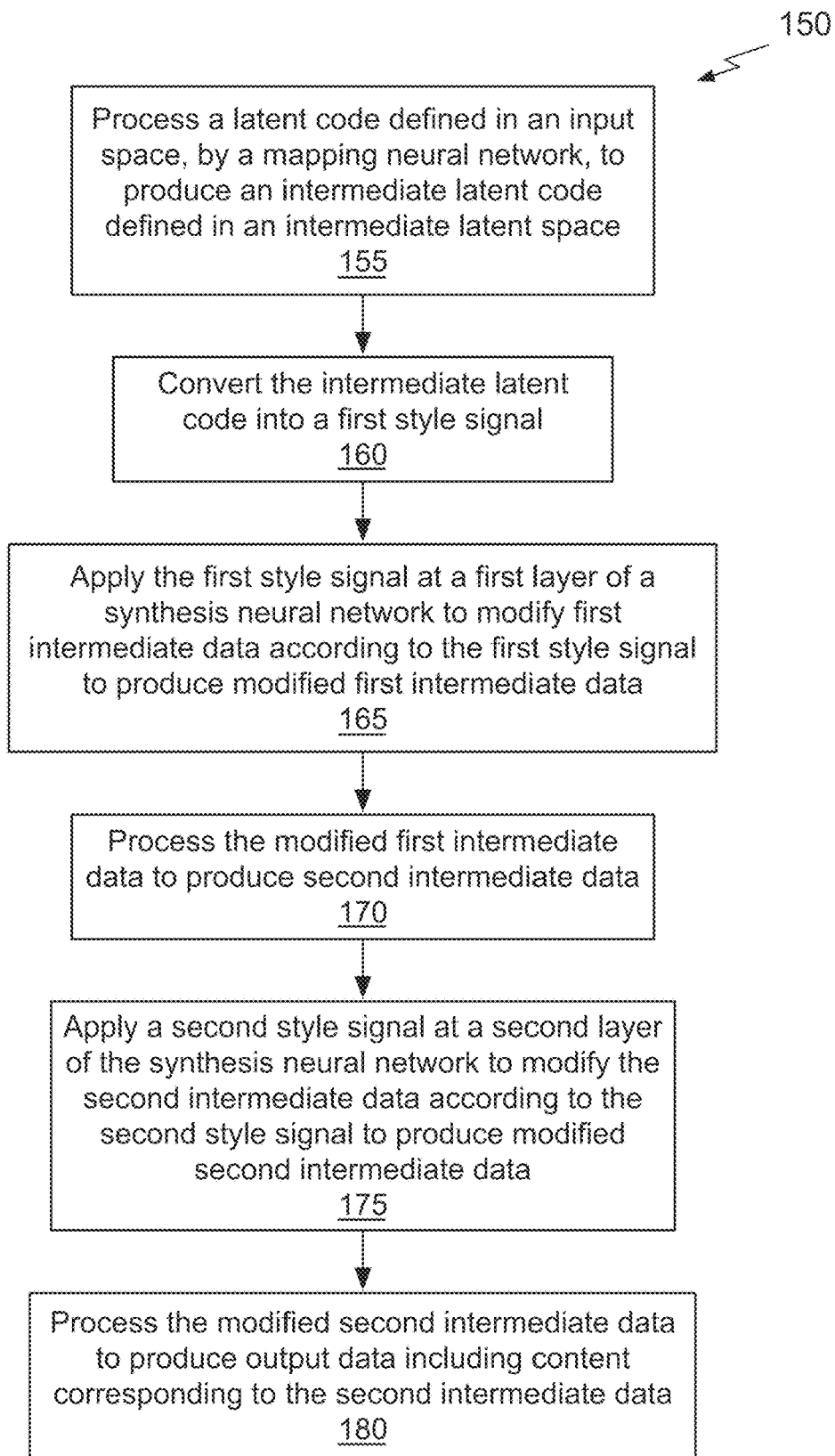
FIG. 1C illustrates a flowchart of a method for style-based generation, in accordance with an embodiment.

FIG. 1C illustrates a flowchart of a method 150 for style-based generation, in accordance with an embodiment. The method 150 may be performed by a program, custom circuitry, or by a combination of custom circuitry and a program. For example, the method 150 may be executed by a GPU (graphics processing unit), CPU (central processing unit), or any processor capable of performing the operations of the style-based generator system 100. Furthermore, persons of ordinary skill in the art will understand that any system that performs method 150 is within the scope and spirit of embodiments of the present invention.

At step 155, the mapping neural network 110 processes a latent code defined in an input space, to produce an intermediate latent code defined in an intermediate latent space. At step 160, the intermediate latent code is converted into a first style signal by the style conversion unit 115. At step 165, the first style signal is applied at a first layer 120 of the synthesis neural network 140 to modify the first intermediate data according to the first style signal to produce modified first intermediate data. At step 170, the modified first intermediate data is processed by the processing layer(s) 125 to produce the second intermediate data. At step 175, a second style signal is applied at the second layer 130 of the synthesis neural network 140 to modify the second intermediate data according to the second style signal to produce modified second intermediate data. At step 180, the modified second intermediate data is processed by the processing layer(s) 135 to produce output data including content corresponding to the second intermediate data.

There are various definitions for disentanglement, but a common goal is a latent space that consists of linear subspaces, each of which controls one factor of variation. However, the sampling probability of each combination of factors in the latent space $\mathcal{Z}$ needs to match the corresponding density in the training data.

A major benefit of the style-based generator system 100 is that the intermediate latent space $\mathcal{W}$ does not have to support sampling according to any fixed distribution; the sampling density for the style-based generator system 100 is induced by the learned piecewise continuous mapping $f(z)$. The mapping can be adapted to "unwarp" $\mathcal{W}$ so that the factors of variation become more linear. The style-based generator system 100 may naturally tend to unwarp $\mathcal{W}$, as it should be easier to generate realistic images based on a disentangled representation than based on an entangled representation. As such, the training may yield a less entangled $\mathcal{W}$ in an unsupervised setting, i.e., when the factors of variation are not known in advance.

Figure 2A:
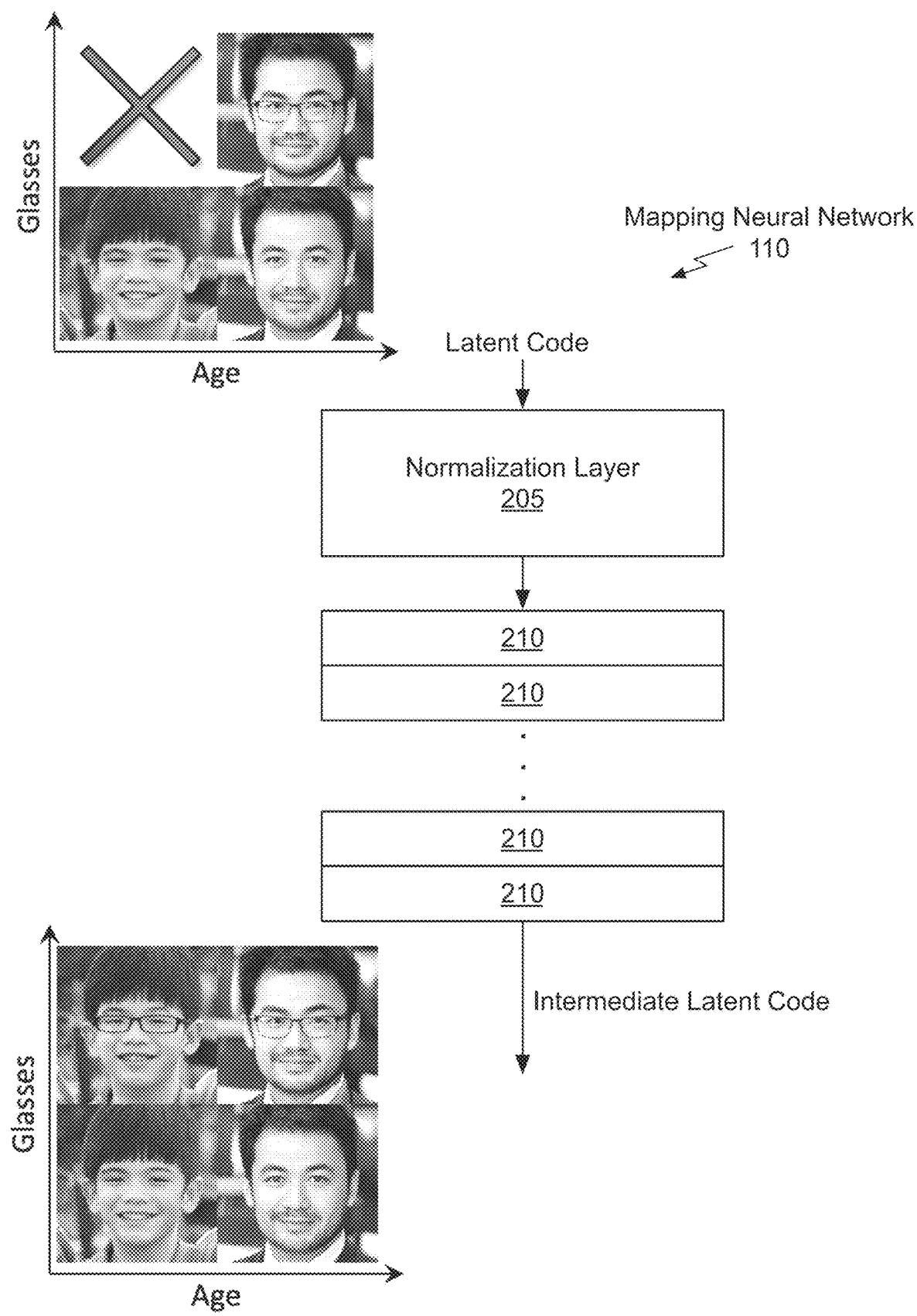
FIG. 2A illustrates a block diagram of the mapping neural network shown in FIG. 1A, in accordance with an embodiment.

FIG. 2A illustrates a block diagram of the mapping neural network 110 shown in FIG. 1A, in accordance with an embodiment. A distribution of the training data may be missing a combination of attributes, such as, children wearing glasses. A distribution of the factors of variation in the combination of glasses and age becomes more linear in the intermediate latent space $\mathcal{W}$ compared with the latent space $\mathcal{Z}$.

In an embodiment, the mapping neural network 110 includes a normalization layer 205 and multiple fully-connected layers 210. In an embodiment, eight fully-connected layers 210 are coupled in sequence to produce the intermediate latent code. Parameters (e.g., weights) of the mapping neural network 110 are learned during training and the parameters are used to process the input latent codes when the style-based generator system 100 is deployed to generate the output data. In an embodiment, the mapping neural network 110 generates one or more intermediate latent codes that are used by the synthesis neural network 140 at a later time to generate the output data.

There are many attributes in human portraits that can be regarded as stochastic, such as the exact placement of hairs, stubble, freckles, or skin pores. Any of these can be randomized without affecting a perception of the image as long as the randomizations follow the correct distribution. The artificial omission of noise when generating images leads to images with a featureless "painterly" look. In particular, when generating human portraits, coarse noise may cause large-scale curling of hair and appearance of larger background features, while the fine noise may bring out the finer curls of hair, finer background detail, and skin pores.

A conventional generator may only generate stochastic variation based on the input to the neural network, as provided through the input layer. During the training, the conventional generator may be forced to learn to generate spatially-varying pseudorandom numbers from earlier activations whenever the pseudorandom numbers are needed. In other words, pseudorandom number generation is not intentionally built into the conventional generator. Instead, the generation of pseudorandom numbers emerges on its own during training in order for the conventional generator to satisfy the training objective. Generating the pseudorandom numbers consumes neural network capacity and hiding the periodicity of generated signal is difficult—and not always successful, as evidenced by commonly seen repetitive patterns in generated images. In contrast, style-based generator system 100 may be configured to avoid these limitations by adding per-pixel noise after each convolution.

In an embodiment, the style-based generator system 100 is configured with a direct means to generate stochastic detail by introducing explicit noise inputs. In an embodiment, the noise inputs are single-channel images consisting of uncorrelated Gaussian noise, and a dedicated noise image is input to one or more layers of the synthesis network 140. The noise image may be broadcast to all feature maps using learned per-feature scaling factors and then added to the output of the corresponding convolution.

Figure 2B:
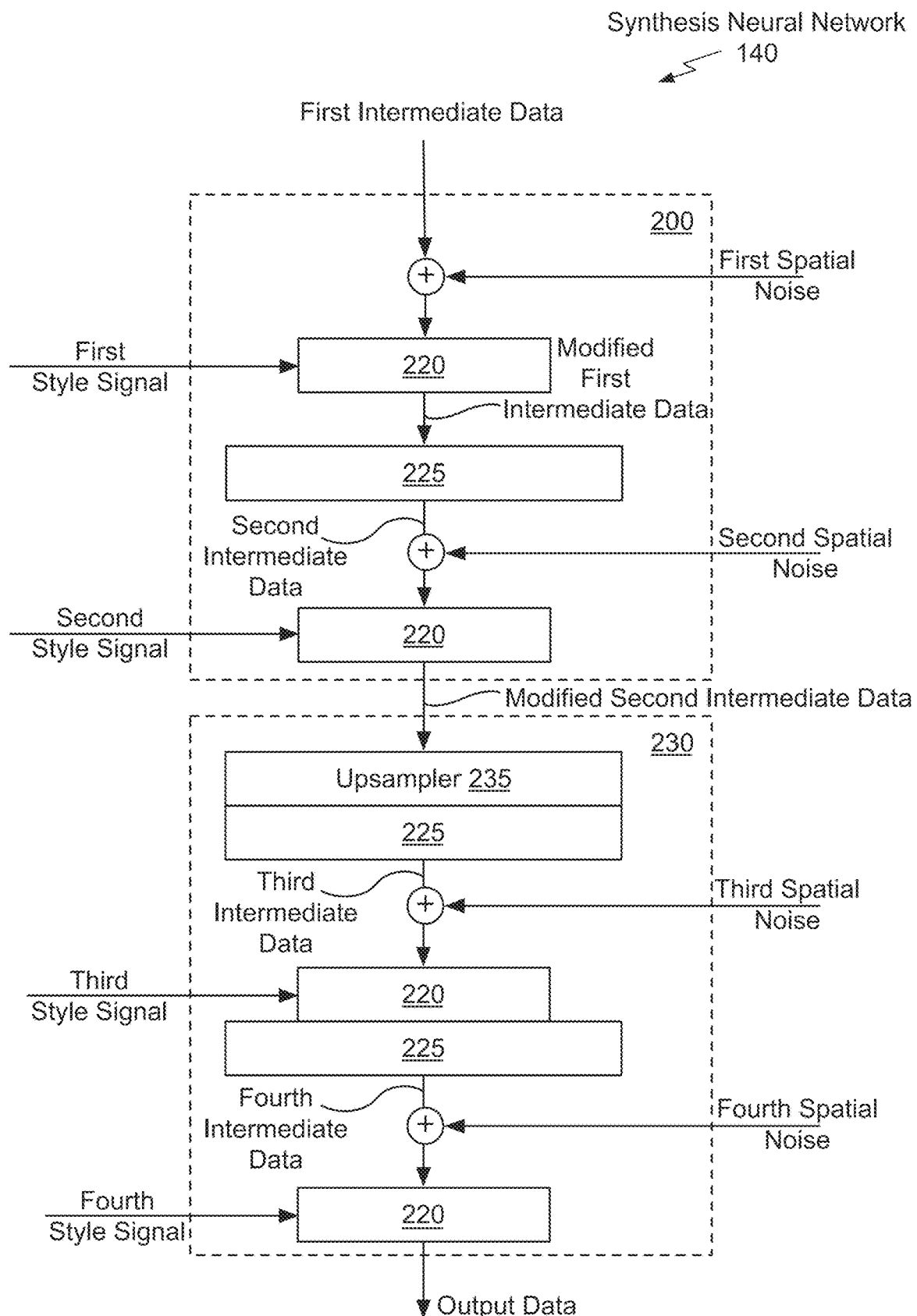
FIG. 2B illustrates a block diagram of the synthesis neural network shown in FIG. 1A, in accordance with an embodiment.

FIG. 2B illustrates a block diagram of the synthesis neural network 140 shown in FIG. 1A, in accordance with an embodiment. The synthesis neural network 140 includes a first processing block 200 and a second processing block 230. In an embodiment, the processing block 200 processes 4×4 resolution feature maps and the processing block 230 processes 8×8 resolution feature maps. One or more additional processing blocks may be included in the synthesis neural network 140 after the processing blocks 200 and 230, before them, and/or between them.

The first processing block 200 receives the first intermediate data, first spatial noise, and second spatial noise. In an embodiment, the first spatial noise is scaled by a learned per-channel scaling factor before being combined with (e.g., added to) the first intermediate data. In an embodiment, the first spatial noise, second spatial noise, third spatial noise, and fourth spatial noise is independent per-pixel Gaussian noise.

The first processing block 200 also receives the first style signal and the second style signal. As previously explained, the style signals may be obtained by processing the intermediate latent code according to a learned affine transform. Learned affine transformations specialize w to styles $y=(y_s, y_b)$ that control adaptive instance normalization (AdaIN) operations implemented by the modules 220 in the synthesis neural network 140. Compared to more general feature transforms, AdaIN is particularly well suited for implementation in the style-based generator system 100 due to its efficiency and compact representation.

The AdaIN operation is defined $$AdaIN(x_i, y) = y_{s,i} \frac{x_i - \mu(x_i)}{\sigma(x_i)} + y_{b,i} \quad (1)$$

where each feature map $x_i$, is normalized separately, and then scaled and biased using the corresponding scalar components from style y. Thus, the dimensionality of y is twice the number of feature maps compared to the input of the layer. In an embodiment, a dimension of the style signal is a multiple of a number of feature maps in the layer at which the style signal is applied. In contrast with conventional style transfer, the spatially invariant style y is computed from vector w instead of an example image.

The effects of each style signal are localized in the synthesis neural network 140, i.e., modifying a specific subset of the style signals can be expected to affect only certain attributes of an image represented by the output data. To see the reason for the localization, consider how the AdaIN operation (Eq. 1) implemented by the module 220 first normalizes each channel to zero mean and unit variance, and only then applies scales and biases based on the style signal. The new per-channel statistics, as dictated by the style, modify the relative importance of features for the subsequent convolution operation, but the new per-channel statistics do not depend on the original statistics because of the normalization. Thus, each style signal controls only a pre-defined number of convolution(s) 225 before being overridden by the next AdaIN operation. In an embodiment, scaled spatial noise is added to the features after each convolution and before processing by another module 220.

Each module 220 may be followed by a convolution layer 225. In an embodiment, the convolution layer 225 applies a 3×3 convolution kernel to the input. Within the processing block 200, second intermediate data output by the convolution layer 225 is combined with the second spatial noise and input to a second module 220 that applies the second style signal to generate an output of the processing block 200. In an embodiment, the second spatial noise is scaled by a learned per-channel scaling factor before being combined with (e.g., added to) the second intermediate data.

The processing block 230 receives feature maps output by the processing block 200 and the feature maps are up-sampled by an up-sampling layer 235. In an embodiment 4×4 feature maps are up-sampled by the up-sampling layer 235 to produce 8×8 feature maps. The up-sampled feature maps are input to another convolution layer 225 to produce third intermediate data. Within the processing block 230, the third intermediate data is combined with the third spatial noise and input to a third module 220 that applies the third style signal via an AdaIN operation. In an embodiment, the third spatial noise is scaled by a learned per-channel scaling factor before being combined with (e.g., added to) the third intermediate data. The output of the third module 220 is processed by another convolution layer 225 to produce fourth intermediate data. The fourth intermediate data is combined with the fourth spatial noise and input to a fourth module 220 that applies the fourth style signal via an AdaIN operation. In an embodiment, the fourth spatial noise is scaled by a learned per-channel scaling factor before being combined with (e.g., added to) the fourth intermediate data.

In an embodiment, a resolution of the output data is $1024^2$ and the synthesis neural network 140 includes 18 layers—two for each power-of-two resolution ($4^2$-$1024^2$). The output of the last layer of the synthesis neural network 140 may be converted to RGB using a separate 1×1 convolution. In an embodiment, the synthesis neural network 140 has a total of 26.2M trainable parameters, compared to 23.1 M in a conventional generator with the same number of layers and feature maps.

Introducing spatial noise affects only the stochastic aspects of the output data, leaving the overall composition and high-level attributes such as identity intact. Separate noise inputs to the synthesis neural network 140 enables the application of stochastic variation to different subsets of layers. Applying a spatial noise input to a particular layer of the synthesis neural network 140 leads to stochastic variation at a scale that matches the scale of the particular layer.

The effect of noise appears tightly localized in the synthesis neural network 140. At any point in the synthesis neural network 140, there is pressure to introduce new content as soon as possible, and the easiest way for the synthesis neural network 140 to create stochastic variation is to rely on the spatial noise inputs. A fresh set of spatial noise is available for each layer in the synthesis neural network 140, and thus there is no incentive to generate the stochastic effects from earlier activations, leading to a localized effect. Therefore, the noise affects only inconsequential stochastic variation (differently combed hair, beard, etc.). In contrast, changes to the style signals have global effects (changing pose, identity, etc.).

In the synthesis neural network 140, when the output data is an image, the style signals affect the entire image because complete feature maps are scaled and biased with the same values. Therefore, global effects such as pose, lighting, or background style can be controlled coherently. Meanwhile, the spatial noise is added independently to each pixel and is thus ideally suited for controlling stochastic variation. If the synthesis neural network 140 tried to control, e.g., pose using the noise, that would lead to spatially inconsistent decisions that would be penalized during training. Thus, the synthesis neural network 140 learns to use the global and local channels appropriately, without explicit guidance.

Figure 2C:
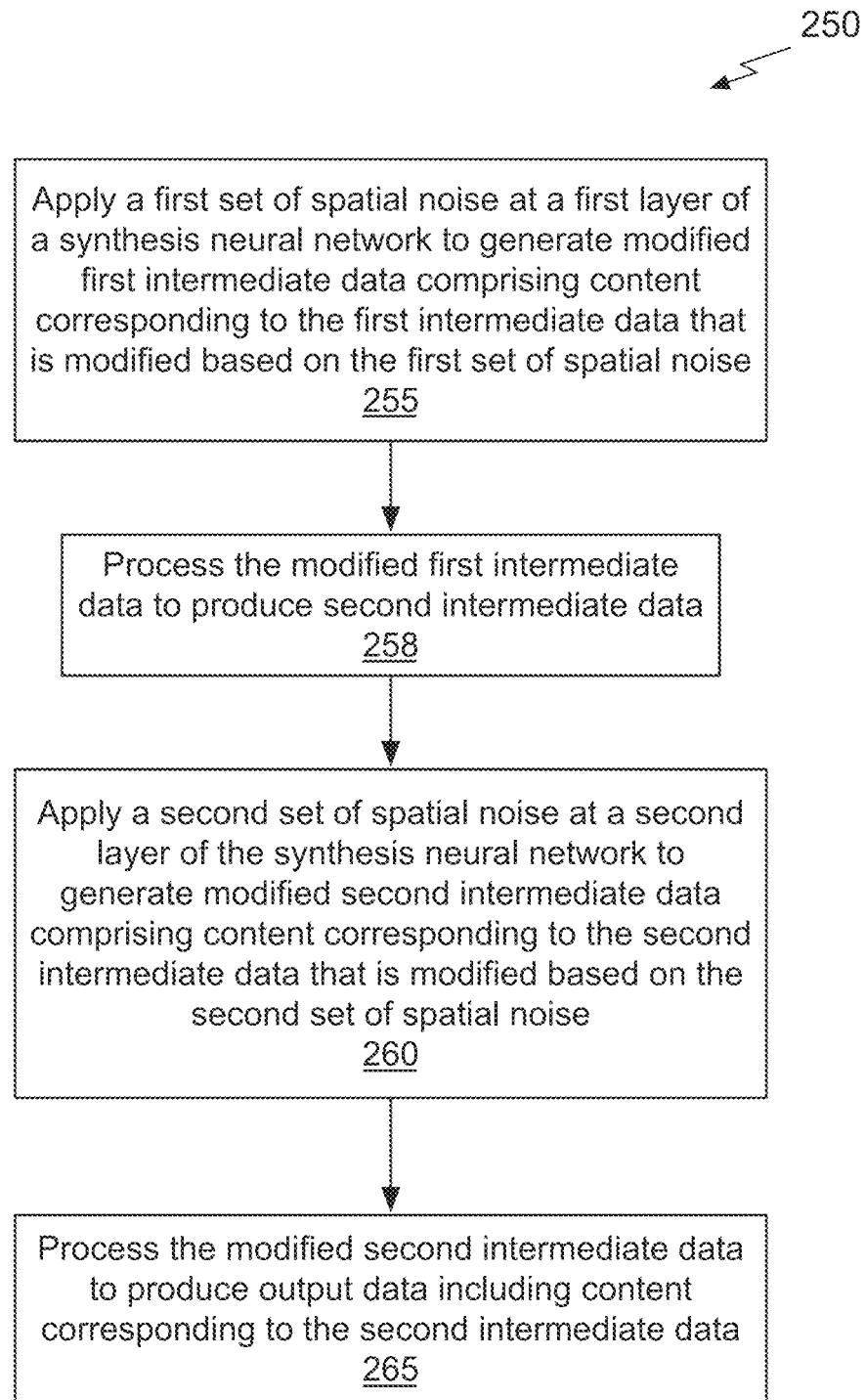
FIG. 2C illustrates a flowchart of a method for applying spatial noise using the style-based generator system, in accordance with an embodiment.

FIG. 2C illustrates a flowchart of a method 250 for applying spatial noise using the style-based generator system 100, in accordance with an embodiment. The method 250 may be performed by a program, custom circuitry, or by a combination of custom circuitry and a program. For example, the method 250 may be executed by a GPU (graphics processing unit), CPU (central processing unit), or any processor capable of performing the operations of the style-based generator system 100. Furthermore, persons of ordinary skill in the art will understand that any system that performs method 250 is within the scope and spirit of embodiments of the present invention.

At step 255, a first set of spatial noise is applied at a first layer of the synthesis neural network 140 to generate the first intermediate data comprising content corresponding to source data that is modified based on the first set of spatial noise. In an embodiment, the source data is the first intermediate data and the first layer is a layer including the module 220 and/or the convolution layer 225. At step 258, the modified first intermediate data is processed by the processing layer(s) 125 to produce the second intermediate data. At step 260, a second set of spatial noise is applied at a second layer of the synthesis neural network 140 to generate second intermediate data comprising content corresponding to the first intermediate data that is modified based on the second set of spatial noise. In an embodiment, the first intermediate data is modified by at least the module 220 to produce the second intermediate data. At step 265, the second intermediate data is processed to produce output data including content corresponding to the second intermediate data. In an embodiment, the second intermediate data is processed by another module 220 and the block 230 to produce the output data.

Noise may be injected into the layers of the synthesis neural network 140 to cause synthesis of stochastic variations at a scale corresponding to the layer. Importantly, the noise should be injected during both training and generation. Additionally, during generation, the strength of the noise may be modified to further control the "look" of the output data. Providing style signals instead of directly inputting the latent code into the synthesis neural network 140 in combination with noise injected directly into the synthesis neural network 140, leads to automatic, unsupervised separation of high-level attributes (e.g., pose, identity) from stochastic variation (e.g., freckles, hair) in the generated images, and enables intuitive scale-specific mixing and interpolation operations.

In particular, the style signals directly adjust the strength of image attributes at different scales in the synthesis neural network 140. During generation, the style signals can be used to modify selected image attributes. Additionally, during training, the mapping neural network 110 may be configured to perform style mixing regularization to improve localization of the styles.

The mapping neural network 110 embeds the input latent code into the intermediate latent space, which has a profound effect on how the factors of variation are represented in the synthesis neural network 140. The input latent space follows the probability density of the training data, and this likely leads to some degree of unavoidable entanglement. The intermediate latent space is free from that restriction and is therefore allowed to be disentangled. Compared to a conventional generator architecture, the style-based generator system 100 admits a more linear, less entangled representation of different factors of variation. In an embodiment, replacing a conventional generator with the style-based generator may not require modifying any other component of the training framework (loss function, discriminator, optimization method, or the like).

Figure 2D:
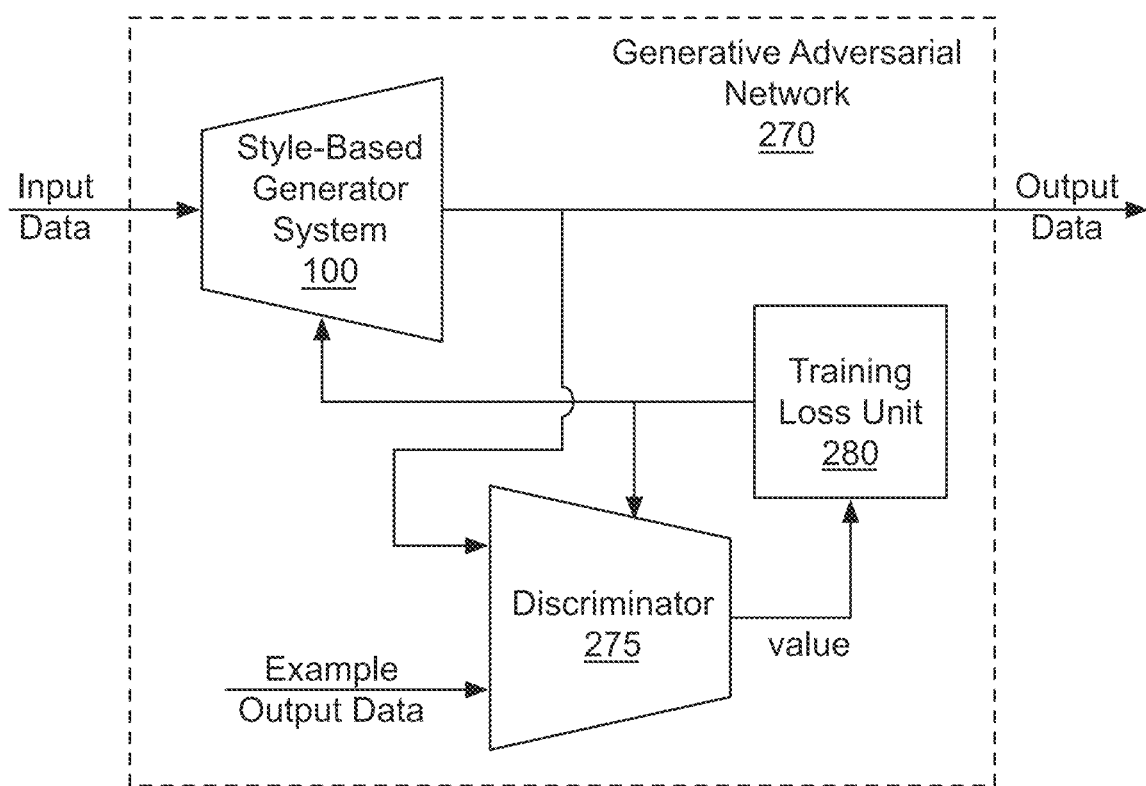
FIG. 2D illustrates a block diagram of a GAN system, in accordance with an embodiment.

The style-based generative neural network 100 may be trained using e.g. the GAN (generative adversarial networks), VAE (variational autoencoder) framework, flow-based framework, or the like. FIG. 2D illustrates a block diagram of the GAN 270 training framework, in accordance with an embodiment. The GAN 270 may be implemented by a program, custom circuitry, or by a combination of custom circuitry and a program. For example, the GAN 270 may be implemented using a GPU, CPU, or any processor capable of performing the operations described herein. Furthermore, persons of ordinary skill in the art will understand that any system that performs the operations of the GAN 270 is within the scope and spirit of embodiments of the present invention.

The GAN 270 includes a generator, such as the style-based generator system 100, a discriminator (neural network) 275, and a training loss unit 280. The topologies of both the generator 110 and discriminator 275 may be modified during training. The GAN 270 may operate in an unsupervised setting or in a conditional setting. The style-based generator system 100 receives input data (e.g., at least one latent code and/or noise inputs) and produces output data. Depending on the task, the output data may be an image, audio, video, or other types of data (configuration setting). The discriminator 275 is an adaptive loss function that is used during training of the style-based generator system 100. The style-based generator system 100 and discriminator 275 are trained simultaneously using a training dataset that includes example output data that the output data produced by the style-based generator system 100 should be consistent with. The style-based generator system 100 generates output data in response to the input data and the discriminator 275 determines if the output data appears similar to the example output data included in the training data. Based on the determination, parameters of the discriminator 275 and/or the style-based generative neural network 100 are adjusted.

In the unsupervised setting, the discriminator 275 outputs a continuous value indicating how closely the output data matches the example output data. For example, in an embodiment, the discriminator 275 outputs a first training stimulus (e.g., high value) when the output data is determined to match the example output data and a second training stimulus (e.g., low value) when the output data is determined to not match the example output data. The training loss unit 280 adjusts parameters (weights) of the GAN 270 based on the output of the discriminator 275. When the style-based generator system 100 is trained for a specific task, such as generating images of human faces, the discriminator outputs a high value when the output data is an image of a human face. The output data generated by the style-based generator system 100 is not required to be identical to the example output data for the discriminator 275 to determine the output data matches the example output data. In the context of the following description, the discriminator 275 determines that the output data matches the example output data when the output data is similar to any of the example output data.

In the conditional setting, the input of the style-based generative neural network 100 may include other data, such as an image, a classification label, segmentation contours, and other (additional) types of data (distribution, audio, etc.). The additional data may be specified in addition to the random latent code, or the additional data may replace the random latent code altogether. The training dataset may include input/output data pairs, and the task of the discriminator 275 may be to determine if the output of the style-based generative neural network 100 appears consistent with the input, based on the example input/output pairs that the discriminator 275 has seen in the training data.

Parallel Processing Architecture

Figure 3:
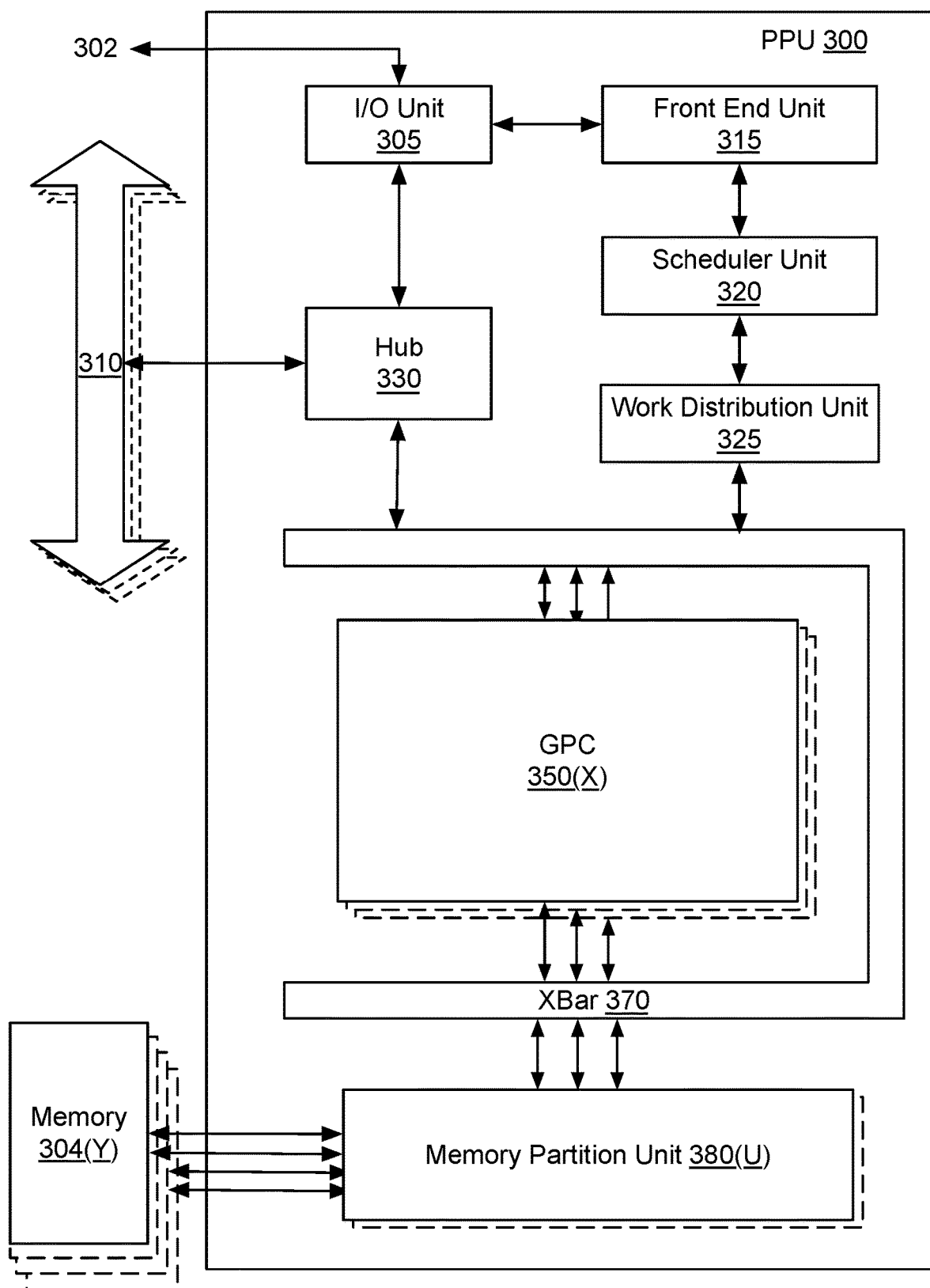
FIG. 3 illustrates a parallel processing unit, in accordance with an embodiment.

FIG. 3 illustrates a parallel processing unit (PPU) 300, in accordance with an embodiment. The PPU 400 may be used to implement the style-based generator system 100. The PPU 400 may be used to implement one or more of the mapping neural network 110, style conversion unit 115, synthesis neural network 140, generative adversarial network 270, style block 640, style block 645, and synthesis neural network 840. In an embodiment, a processor such as the PPU 400 may be configured to implement a neural network model. The neural network model may be implemented as software instructions executed by the processor or, in other embodiments, the processor can include a matrix of hardware elements configured to process a set of inputs (e.g., electrical signals representing values) to generate a set of outputs, which can represent activations of the neural network model. In yet other embodiments, the neural network model can be implemented as a combination of software instructions and processing performed by a matrix of hardware elements. Implementing the neural network model can include determining a set of parameters for the neural network model through, e.g., supervised or unsupervised training of the neural network model as well as, or in the alternative, performing inference using the set of parameters to process novel sets of inputs.

In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In another embodiment, the PPU 300 is configured to implement the neural network system 100. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 300 or CPU via the NVLink 310. In an embodiment, the PPU 300 includes a number U of partition units 380 that is equal to the number of separate and distinct memory devices of the memory 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
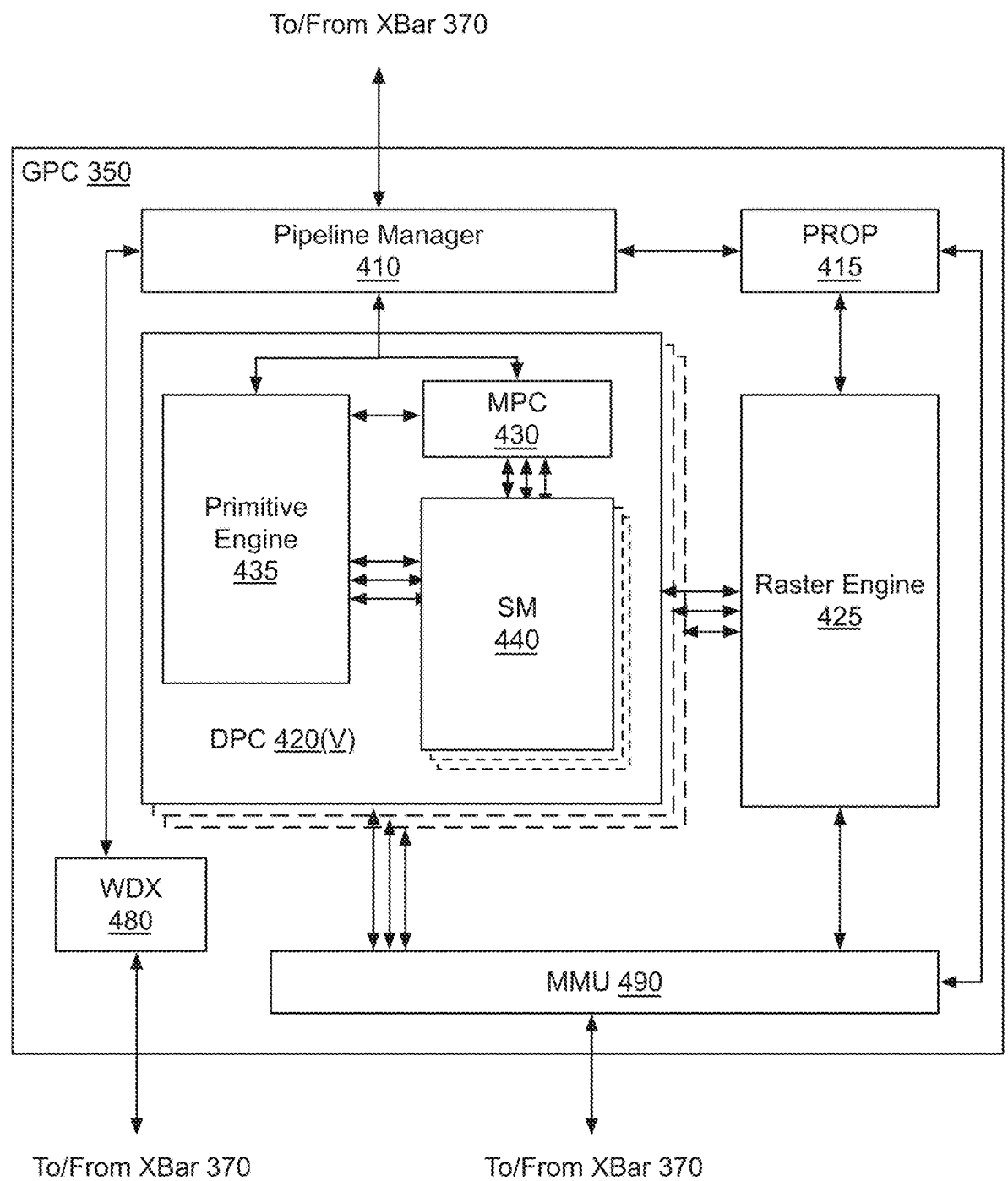
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
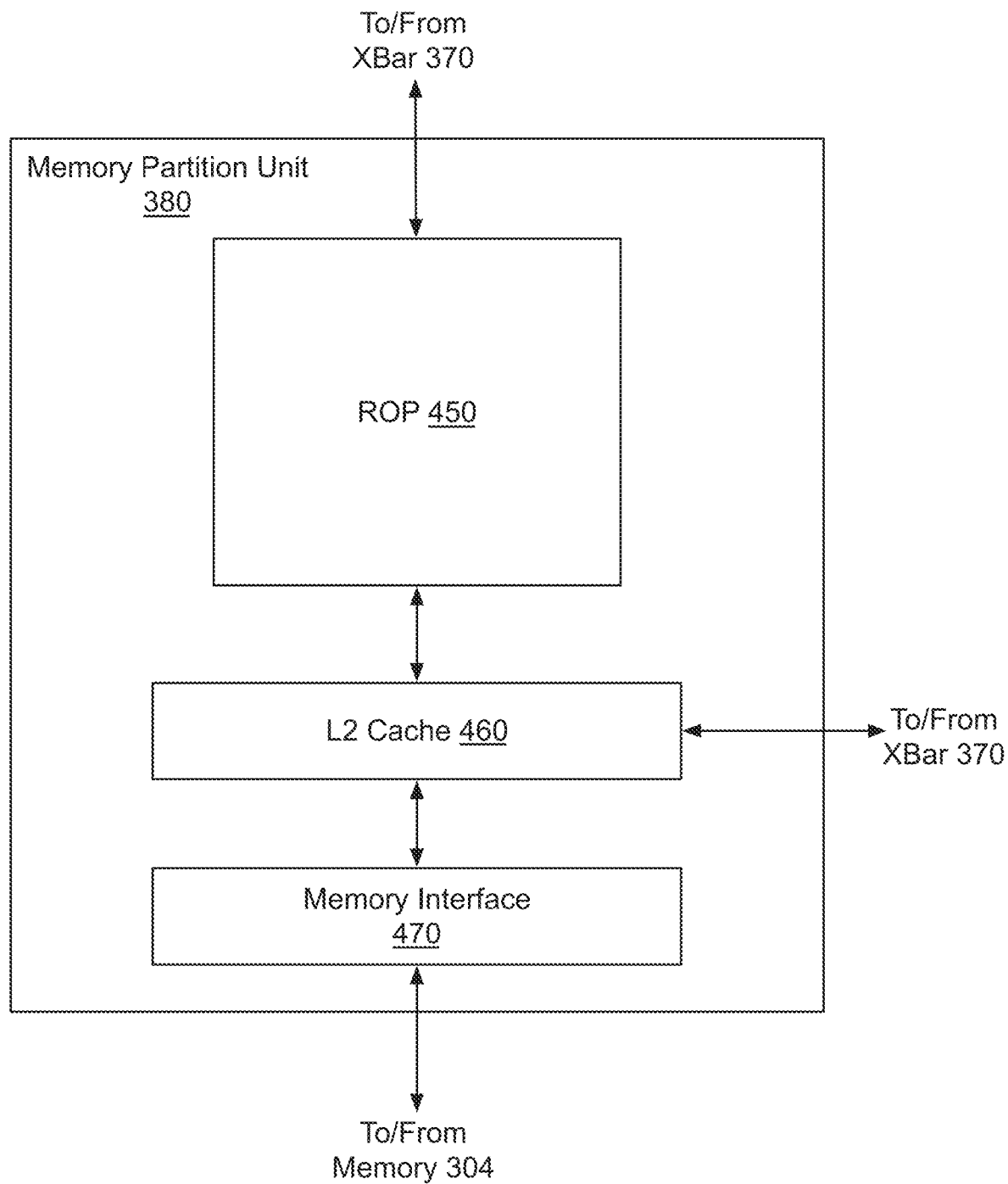
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device of the memory 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
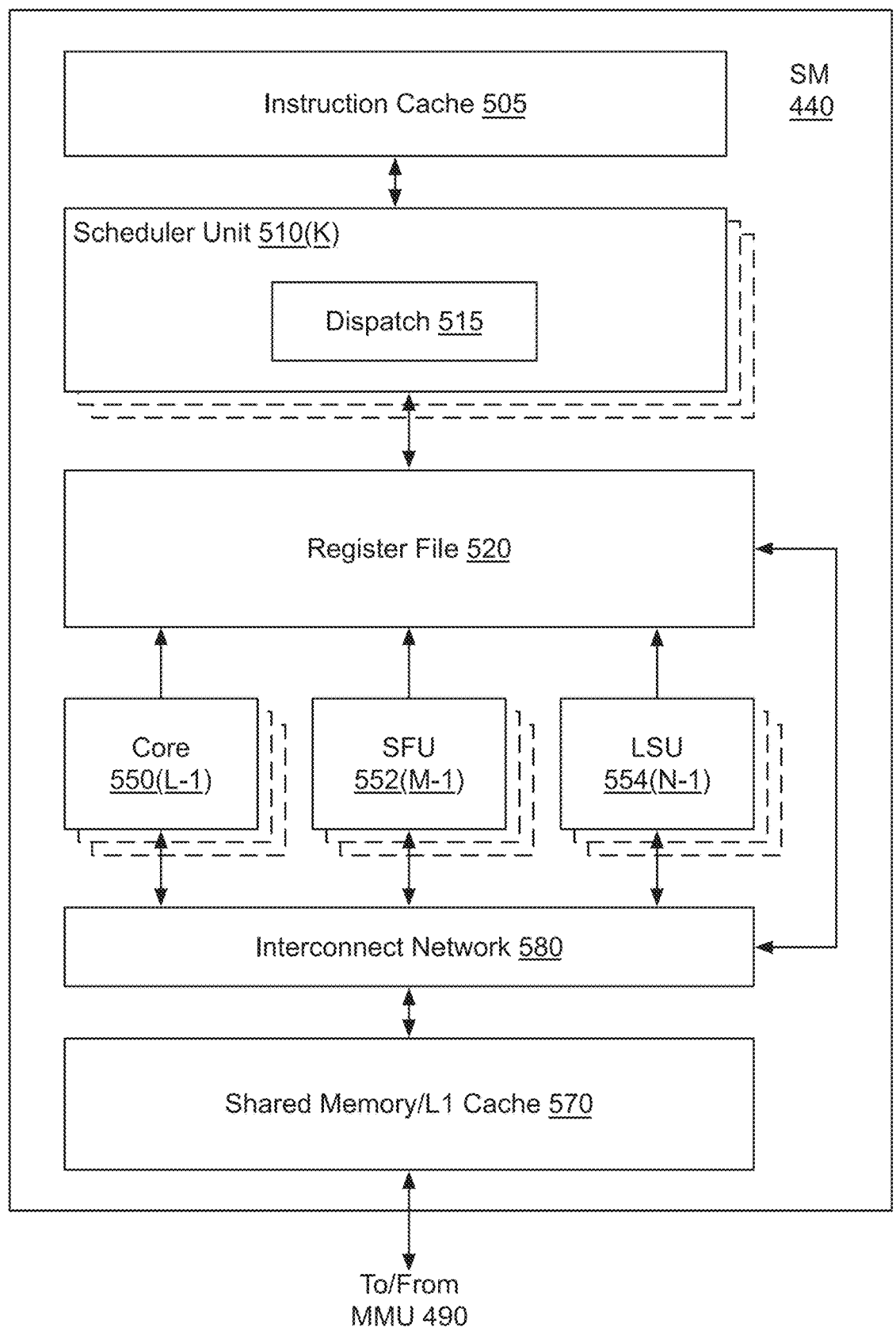
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPUs 300 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard. In yet another embodiment, the PPU 300 may be realized in reconfigurable hardware. In yet another embodiment, parts of the PPU 300 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
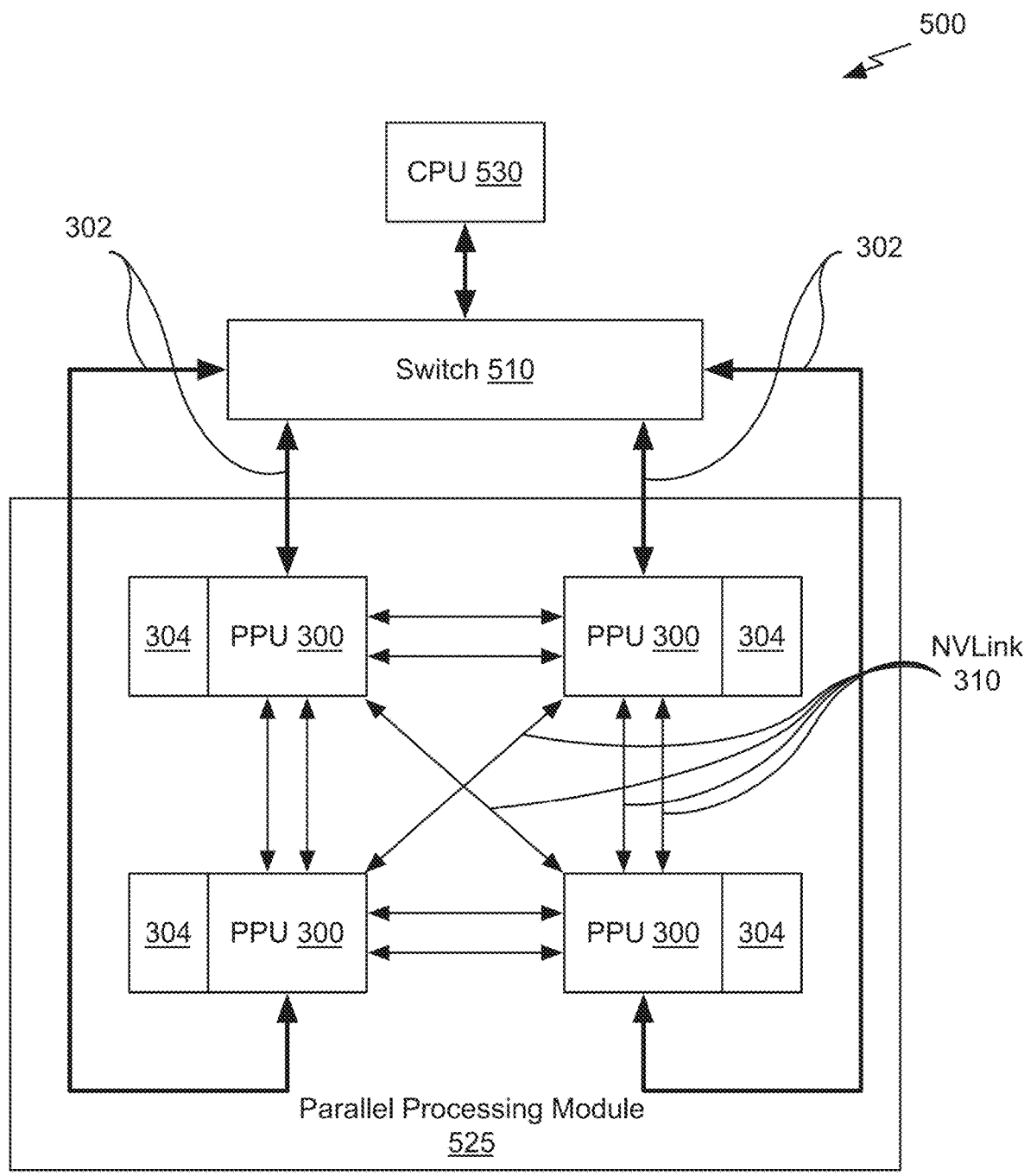
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 150 shown in FIG. 1C and/or the method 250 shown in FIG. 2C. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
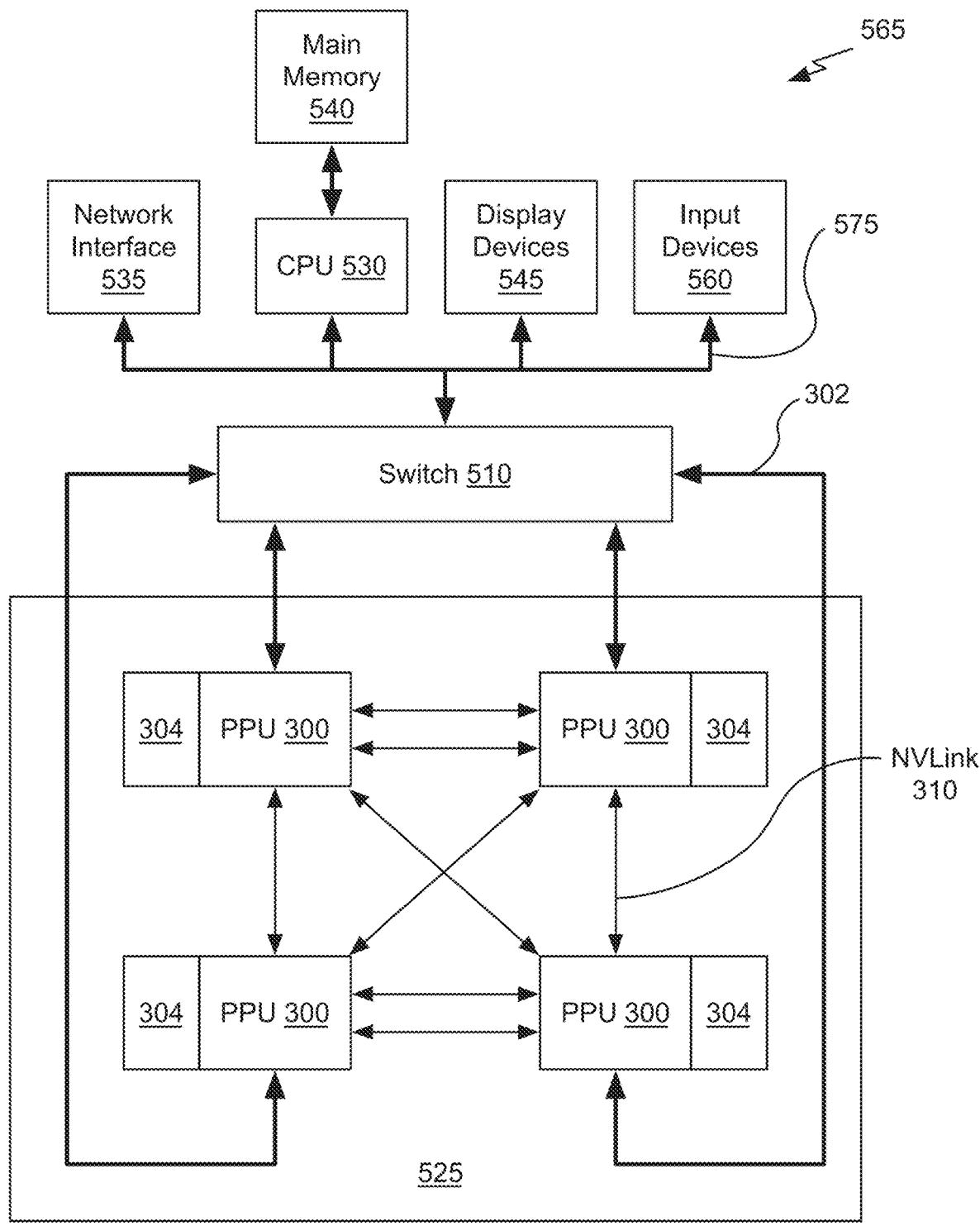
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 150 shown in FIG. 1C and/or the method 250 shown in FIG. 2C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5D:
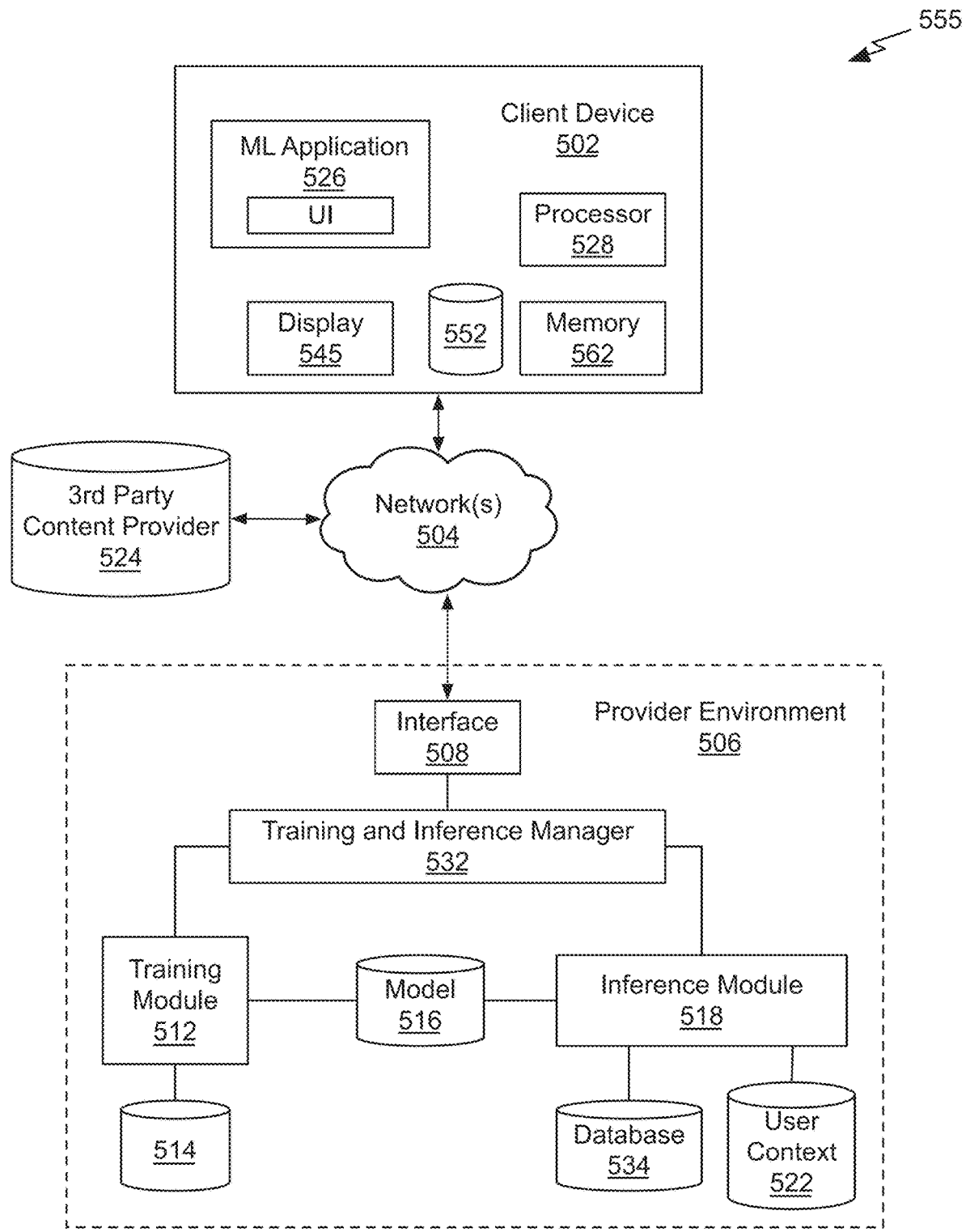
FIG. 5D illustrates components of an exemplary system that can be used to train and utilize machine learning, for use in implementing some embodiments of the present disclosure.

FIG. 5D illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device 502 may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include the Internet, an intranet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or, for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In an embodiment, the set of training data may be used in a generative adversarial training configuration to train a generator neural network.

In at least one embodiment, training data can include images of at least one human subject, avatar, character, animal, object, or the like, for which a neural network is to be trained. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Weight Demodulation for a Generator Neural Network

The style-based GAN architecture (StyleGAN) implemented in the style-based generator system 100 yields impressive results in data-driven unconditional generative image modeling. However, the style-based GAN architecture may synthesize images that include undesirable artifacts. As described further herein, several of the characteristic artifacts may be avoided or reduced by changing the synthesis neural network structure and/or training methods. In an embodiment, the normalization operation is restructured, and the style-based generator system may be regularized to encourage good conditioning in the mapping from latent vectors to output data, such as images. Improving the style-based GAN architecture to avoid and/or reduce artifacts improves the results considerably in unconditional image modeling, both in terms of existing distribution quality metrics as well as perceived output data quality.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 6A:
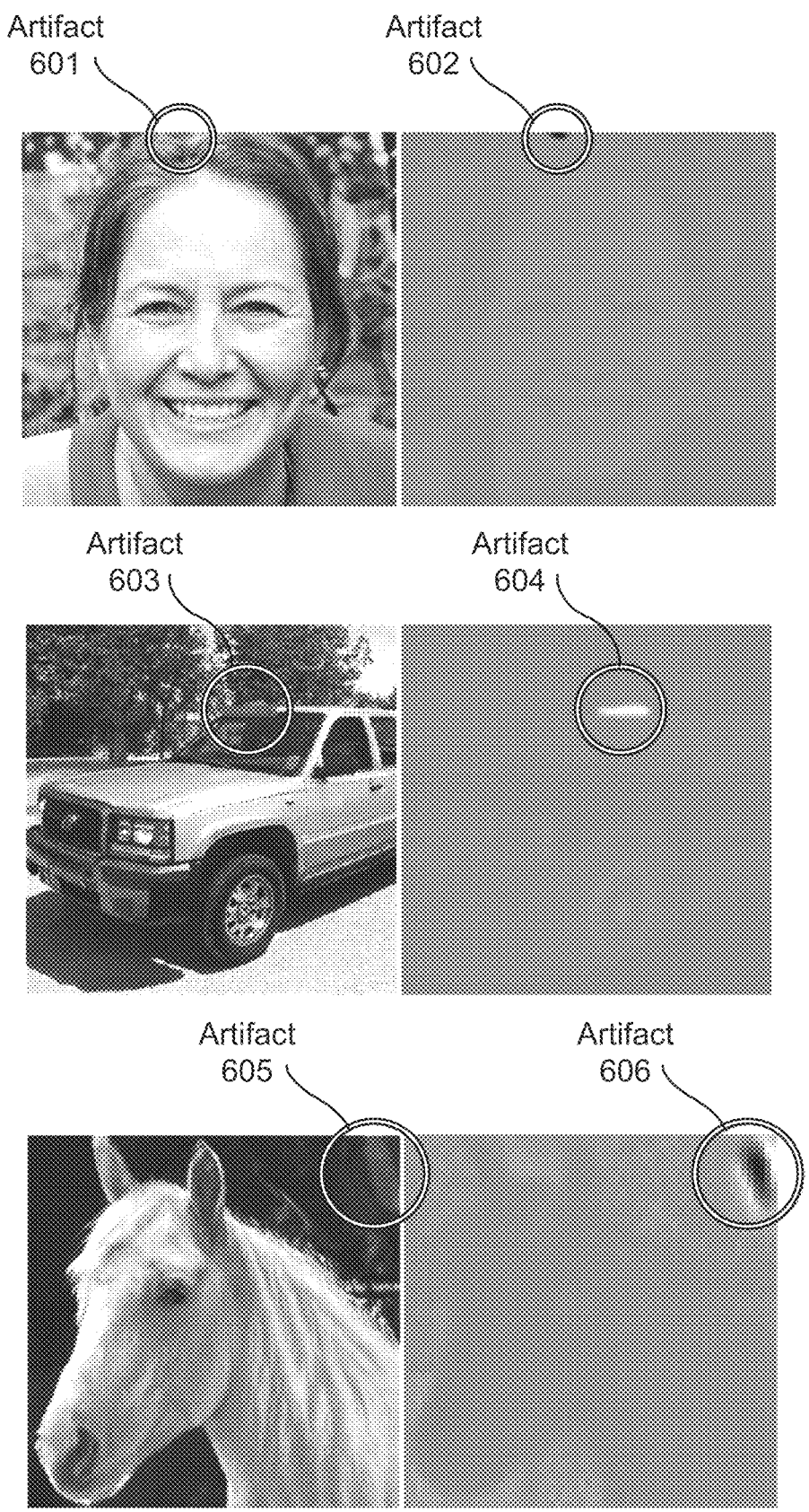
FIG. 6A illustrates artifacts in images generated by the style-based generator system, in accordance with an embodiment.

FIG. 6A illustrates artifacts in images and feature maps that may be generated by the style-based generator system 100, in accordance with an embodiment. An artifact 601 appears as a blob-shaped anomaly resembling a water droplet. Even when the artifact 601 may not be obvious in the final image, artifact 602 is present in the intermediate feature maps produced by the synthesis neural network. In an embodiment, the anomaly starts to appear around 64×64 resolution, is present in all subsequent feature maps, and becomes progressively stronger at higher resolutions. In another example, an artifact 603 is visible in a final image of a vehicle and a corresponding artifact 604 is present in a feature map that is generated during synthesis of the final output image of the vehicle. In another example, an artifact 605 is visible in a final output image of a horse and a corresponding artifact 606 is present in a feature map that is generated during synthesis of the final output image of the horse. The existence of such a consistent artifact is puzzling, as a discriminator should be able to detect it during training.

The "blob" or "water droplet" artifacts in images generated by the synthesis neural network 140 seem to be caused because the normalization operation performed in the processing layers of the synthesis neural network 140 is too destructive and completely removes the mean and scale of the intermediate activations for each feature map. In effect, the style-based GAN likely creates the artifacts to circumvent a design flaw in its architecture.

In review, a distinguishing feature of the style-based generator system 100 is the unconventional architecture of the generator. Instead of feeding the latent code $z \in \mathcal{Z}$ directly as an input to the synthesis neural network 140, the mapping neural network 110 first transforms the input latent code to an intermediate latent code $w \in \mathcal{W}$. Affine transforms performed by the style conversion unit 115 then produce the style signals that control the layers of the synthesis neural network 140 via adaptive instance normalization (AdaIN). In the context of the following description, instance normalization refers to performing normalization separately or independently for each instance or sample (image), without interaction between samples. In contrast, when batch normalization is used all samples in a minibatch are normalized together. Additionally, in an embodiment, stochastic variation is facilitated by providing additional random noise maps to the synthesis neural network 140. The noise maps may be inserted into intermediate data output by each convolution layer of the synthesis neural network 140. It has been demonstrated that the unconventional design allows the intermediate latent space $\mathcal{W}$ to be much less entangled than the input latent space $\mathcal{Z}$. In the context of the following description, the analysis is focused solely on $\mathcal{W}$, as it is the relevant latent space from the point of view of the synthesis neural network 140.

The artifacts are introduced by the AdaIN operation that normalizes the mean and variance of each feature map separately, thereby potentially destroying any information found in the magnitudes of the features relative to each other. The droplet artifact may be a result of the style-based generator system 100 intentionally sneaking signal strength information past instance normalization. More specifically, by creating a strong, localized spike that dominates the statistics, the style-based generator system 100 can effectively scale the signal as it likes elsewhere. This hypothesis is supported by the finding that, in an embodiment, when the normalization step is removed from the synthesis neural network 140, as detailed below, the droplet artifacts disappear completely.

Figure 6B:
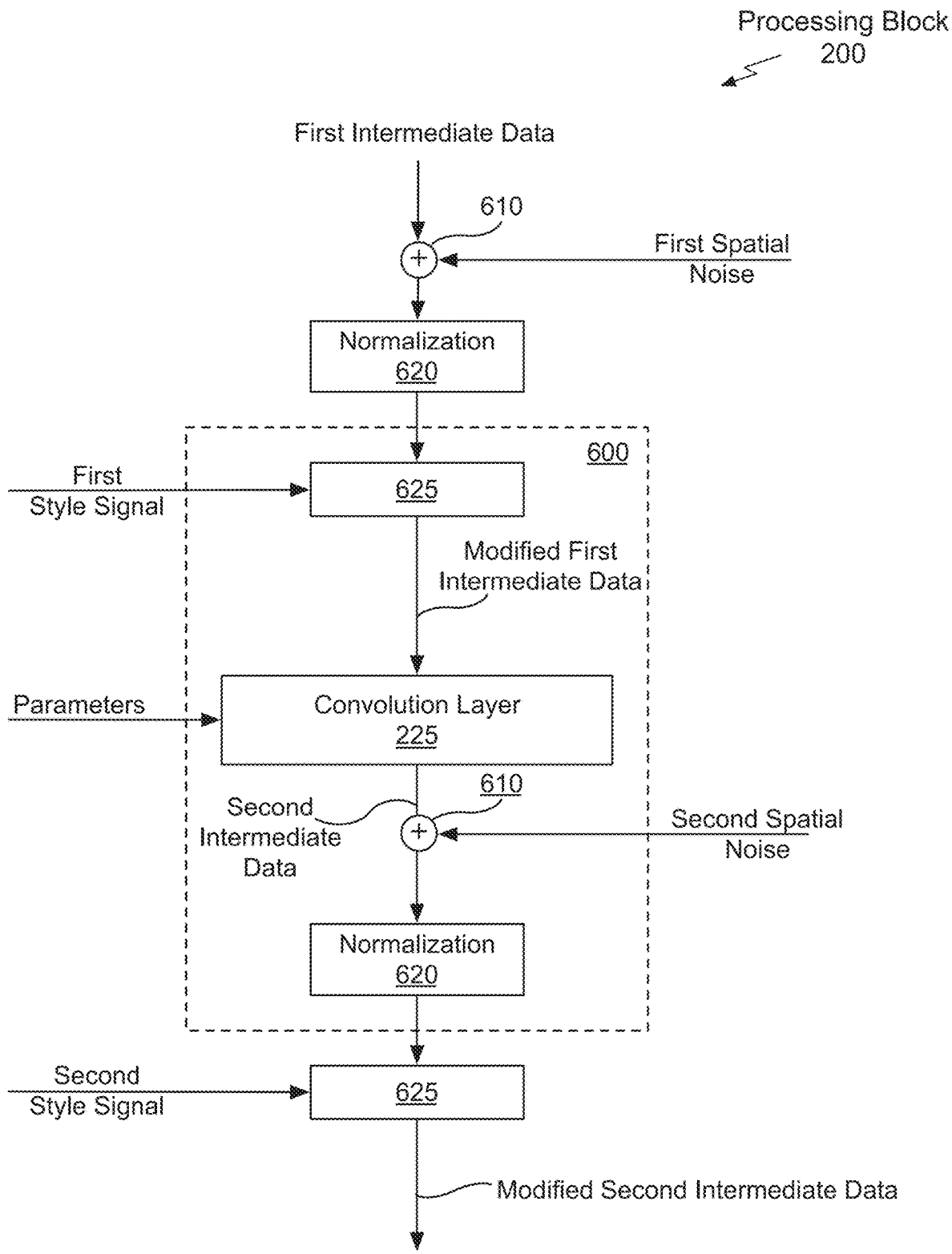
FIG. 6B illustrates a block diagram of the processing block shown in FIG. 2B, in accordance with an embodiment.

FIG. 6B illustrates a block diagram of the processing block 200 shown in FIG. 2B, in accordance with an embodiment. In the synthesis neural network 140 shown in FIGS. 1A and 2B, style signals may be active for each processing stage to apply attributes that are specific to the processing stage. In an embodiment, the style conversion unit 115 applies a learned affine transformation to $\mathcal{W}$ to produce each style signal. Conceptually, feature maps (representing content of an image) generated by different processing layers 125, 135, and/or 220 of the synthesis neural network 140 are modified based on style signals provided by the mapping neural network 110. In other words, the first order statistics are replaced with style-specific attributes for each stage. Compared with FIGS. 1A and 2B, the adaptive instance normalization (AdaIN) operation within the layers 120 and 130 and the modules 220 is broken down into to its two constituent parts: normalization 620 followed by modulation 625, both operating on the mean and standard deviation per feature map. The normalization 620 is performed for each style application to avoid accumulation of the particular style in subsequent stages where different styles may be applied at different scales.

Before the normalization 620, spatial noise may be inserted into the first intermediate data by element 610. In an embodiment, the first intermediate data is the learned constant or input sample. In an embodiment (not shown), a bias may also be applied for each scale along with the spatial noise. Learned parameters (weights) are applied by each convolution layer 225. A style block 600 that includes at least the convolution layer 225, normalization 620, insertion of spatial noise by element 610, and demodulation 625 may be restructured to remove artifacts by demodulating the weights (instead of normalizing the activations). Interestingly, the synthesis neural network 140 applies the spatial noise within the processing block 200, causing a relative impact of the spatial noise to be inversely proportional to a magnitude of the style signal that is applied at the processing block 200. More predictable results may be obtained by moving the insertion operation outside of the processing block 200, so that the insertion instead operates on normalized data.

Figure 6C:
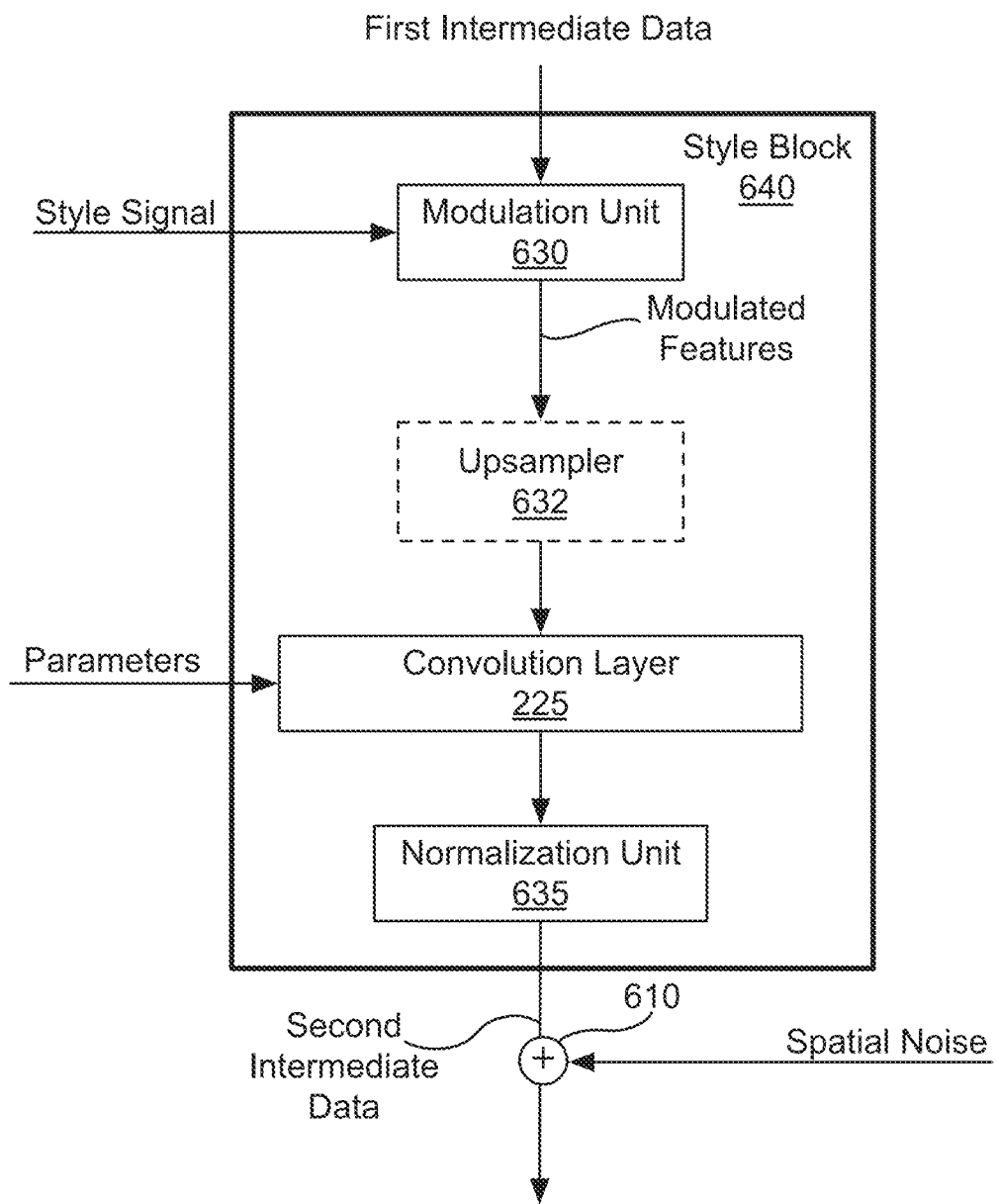
FIG. 6C illustrates a block diagram of a style block, for use in implementing some embodiments of the present disclosure.

FIG. 6C illustrates a block diagram of a style block 640, for use in implementing some embodiments of the present disclosure. Compared with the processing block 200 shown in FIG. 6B, insertion of the spatial noise (and bias) by the element 610 is moved outside of the style block 640. In other words, the spatial noise and bias are applied independent of each style encoded in a style signal. In an embodiment, after moving the insertion operation outside of the style block 600 to produce the style block 640, it is sufficient for the normalization and modulation to operate on the standard deviation alone (i.e., the mean is not needed). In an embodiment, the application of bias, spatial noise, and normalization to the input sample (e.g., first intermediate data) can also be safely removed without observable drawbacks.

Compared with the normalization 620 and modulation 625 in the style block 600, modulation of the mean is removed and the modulation unit 630 and normalization unit 635 only operate on the standard deviation. The modulation unit 630 modulates the first intermediate data based on the style signal to produce modulated features. In an embodiment, in addition to the modulation unit 630, the convolution layer 225, and the normalization unit 635, the style block 640 may also include an upsampler 632 that performs operations similar to the upsampler 235 of FIG. 2B. The modulated features are upsampled (or not) and input to the convolution layer 225 as input activations. The parameters are applied to the input activations by the convolution layer 225 to produce output activations.

The style block 640 may be restructured to relax or reduce the strength of the normalization operation while retaining the scale-specific effects of the styles. Simply removing the instance normalization operation improves the image quality (e.g., the blob artifacts are removed). However, removing the instance normalization also causes the effects of the styles to be cumulative rather than specific to each scale. Therefore, the controllability provided by scale-specific styles for synthesis is greatly reduced. An alternative that removes the artifacts while retaining controllability is to base normalization on the expected statistics of the incoming feature maps, but without explicit forcing.

Recall that the style block 640 in FIG. 6C includes at least the modulation unit 630, the convolution layer 225, and the normalization unit 635. The effect of a modulation followed by a convolution is that the modulation scales each input feature map of the convolution based on the incoming style, which can alternatively be implemented by scaling the convolution weights:

$$w'_{ijk} = s_i \cdot w_{ijk}, \qquad \text{Eq. (2)}$$

where w and w' are the original and modulated weights, respectively, $s_i$ is the scale factor corresponding to the ith input feature map, and j and k enumerate the output feature maps and spatial footprint of the convolution, respectively.

Now, the purpose of instance normalization is to essentially remove the effect of s from the statistics of the output feature maps produced by each convolution. The goal of removing the effect of s from the output feature maps can be achieved more directly. Assuming that intermediate data, that are input to the style block 640 are independent and identically distributed (i.i.d.) random variables with unit standard deviation, then after modulation and convolution, the output activations produced by the convolution layer 225 have standard deviation of $$\sigma_j = \sqrt{\Sigma_{i,k} {w'_{ijk}}^2}, \qquad \text{Eq. (3)}$$

i.e., each output feature map is scaled by the $L^2$ norm of the corresponding weights. The subsequent normalization aims to restore the output activations back to unit standard deviation. Based on Equation (3), restoring the outputs is achieved if each output feature map j is scaled ("demodulated") by $1/\sigma_j$. Alternatively, the demodulation can be combined into the convolution weights:

$$w''_{ijk} = w'_{ijk} / \sqrt{\Sigma_{i,k} {w'_{ijk}}^2 + \epsilon} \qquad \text{Eq. (4)}$$

where $\epsilon$ is a small constant to avoid numerical issues.

Considering the practical implementation of Equations (2) and (4), it is important to note that the resulting set of weights will be different for each sample in a minibatch, which may rule out direct implementation using standard convolution primitives. In an embodiment, grouped convolutions may be employed to temporarily reshape the weights and activations so that each convolution sees one sample with N groups—instead of N samples with one group. The grouped convolutions are efficient because the reshaping operations do not actually modify the content of the weight and activation tensors. In another embodiment, explicit scaling operations may be employed before and after the convolution.

Figure 6D:
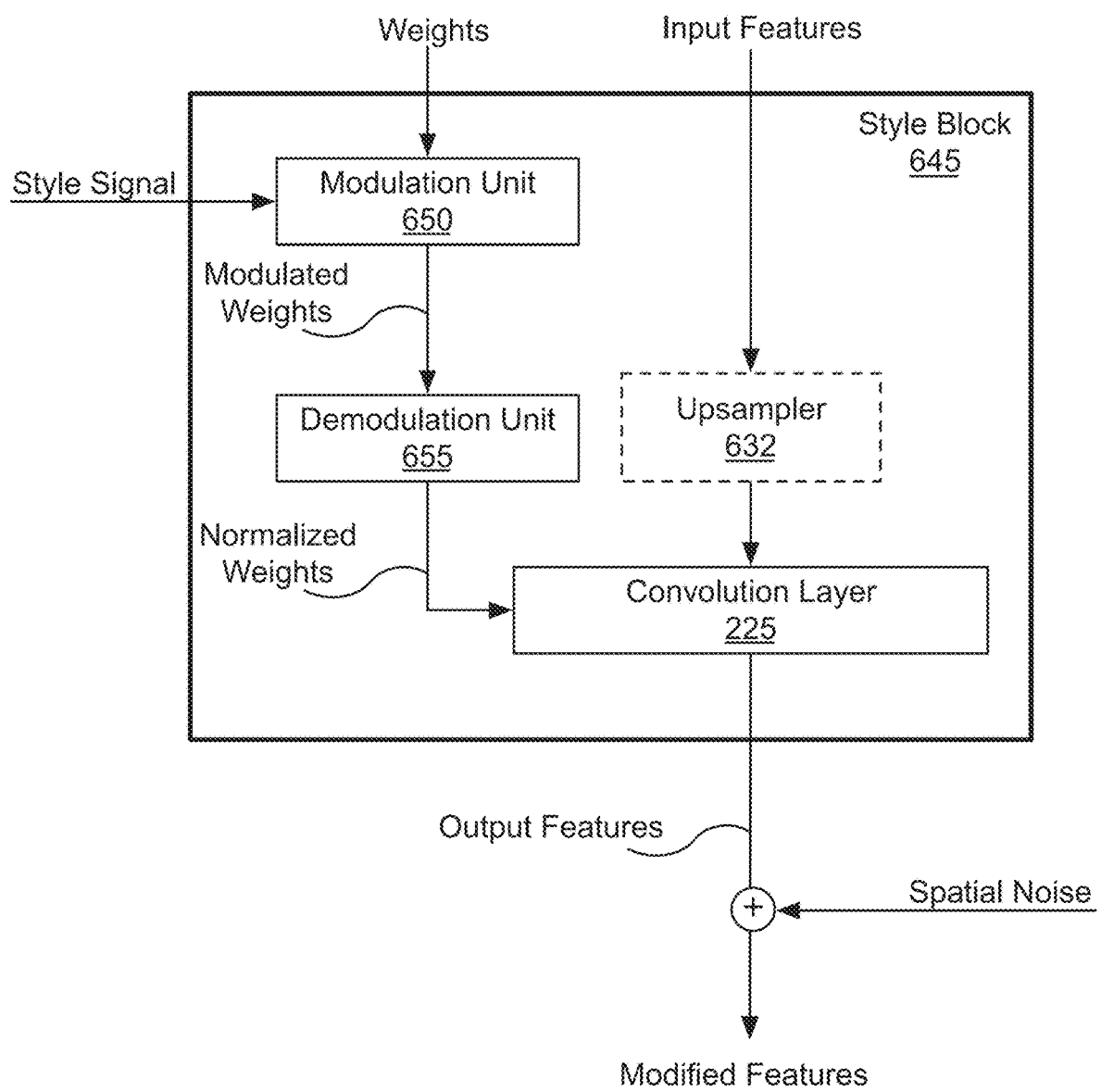
FIG. 6D illustrates a block diagram of another style block, for use in implementing some embodiments of the present disclosure.

FIG. 6D illustrates a block diagram of a style block 645, for use in implementing some embodiments of the present disclosure. The normalization unit 635 in the style block 640 is replaced with a "demodulation" operation that is applied to the weights associated with each convolution layer 225 in the style bock 645. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the style block 640 or 645 is within the scope and spirit of embodiments of the present disclosure.

As shown in FIG. 6D, instead of normalizing the features (e.g., intermediate data), the weights are normalized based on the "expected statistics" of the intermediate data. Because convolution is a linear operator, scaling the weights is equivalent to scaling the features. Therefore, compared with the style block 640, the modulation unit 630 and normalization unit 635 are removed from processing the features and a modulation unit 650 and demodulation unit 655 are inserted in the processing path for the weights.

The weights are first modulated by the style signal by the modulation unit 650 to produce modulated weights. Modulating the weights is equivalent to the modulation unit 630 scaling the first intermediate data to produce the modulated features in the style block 640. In the style block 645, input features are optionally upsampled by the upsampler 632 and input to the convolution layer 225 to produce output features. An expected standard deviation of the output features is computed, assuming that the input features are normally distributed. Finally, the modulated weights are demodulated by the demodulation unit 655, based on the expected standard deviation, to produce normalized weights. Demodulating the modified weights is equivalent to scaling the output features generated by the convolution layer 225. Spatial noise is optionally inserted into the output features to produce modified features. A synthesis neural network that includes at least one style block 645 may then generate output data (e.g., images) according to the styles, but without the "blob" artifacts or with significantly reduced artifacts.

The weights for each convolution layer 225 are adjusted within the style block 645 based on s using Equations (2) and (4). To avoid having to account for the activation function in Equation (4), the activation functions may be scaled so that they retain the expected signal variance. Compared to instance normalization, the demodulation technique is weaker because it is based on statistical assumptions about the signal instead of actual contents of the feature maps. In sum, statistical analysis is implemented by the style block 645 as a replacement for data-dependent normalization.

Figure 6E:
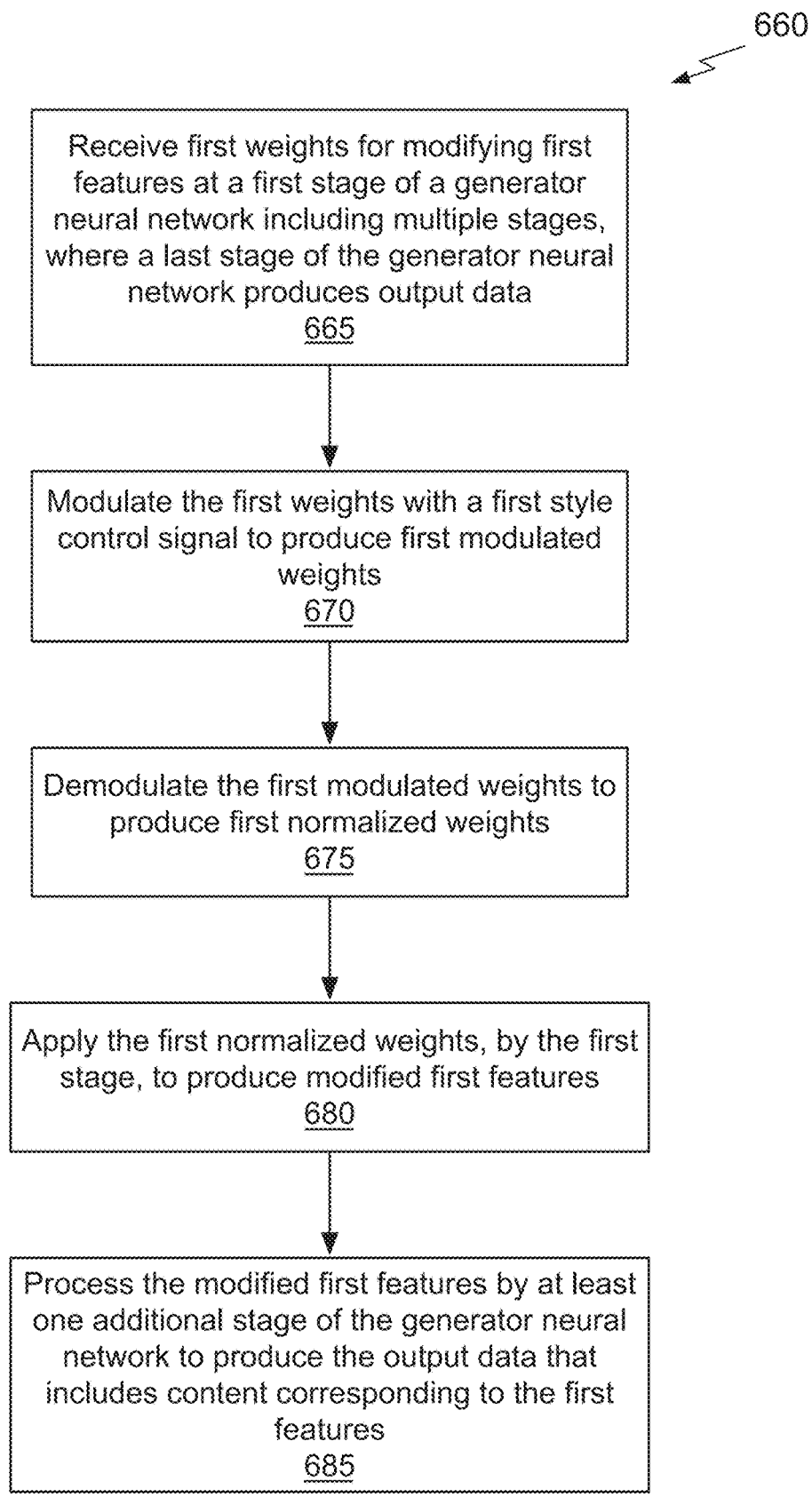
FIG. 6E illustrates a flowchart of a method for demodulating weights applied by a generator neural network, in accordance with an embodiment.

FIG. 6E illustrates a flowchart of a method 660 for demodulating weights applied by a generator neural network, in accordance with an embodiment. Each block of method 660, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 660 is described, by way of example, with respect to the style block 645 of FIG. 6D. However, this method may additionally or alternatively be executed by any one system, or any combination of systems, including, but not limited to, those described herein. Furthermore, persons of ordinary skill in the art will understand that any system that performs method 660 is within the scope and spirit of embodiments of the present disclosure.

At step 665, the style block 645 receives first weights for modifying first features at a first stage of a generator neural network including multiple stages, wherein a last stage of the generator neural network produces output data. In an embodiment, the synthesis neural network 140 of the style-based generator system 100 is restructured to implement the style block 645 to produce the output data. In an embodiment, components of the first intermediate data input to the synthesis neural network 140 are adjusted during training and initialized using N (0,1). In another embodiment, the first intermediate data corresponds to (or is derived from) additional input data, such as a reference image.

At step 670, modulation unit 650 modulates the first weights with a first style control signal to produce first modulated weights. At step 675, the demodulation unit 655 demodulates the first modulated weights to produce first normalized weights. In an embodiment, the modulation unit 650 and demodulation unit 655 perform demodulation to change the weights (instead of activations) on a per-sample basis. In other words, the weights may be modulated for each first intermediate data that is input to the synthesis neural network 140. At step 680, the first normalized weights are applied by the first stage, to produce modified first features. In an embodiment, the modified first features are the output features generated by the style block 645. In an embodiment, the modified first features are modified features resulting from the insertion of spatial noise into the output features. At step 685, the modified first features are processed by at least one additional stage of the generator neural network to produce the output data that includes content corresponding to the first features.

In an embodiment, the at least one additional stage comprises another style block 645. In an embodiment, spatial noise and/or a bias is inserted to further modify the modified features, producing modified intermediate data that is processed by the at least one additional stage of the generator neural network. In an embodiment, the weight modulation and demodulation operations are included in a synthesis neural network comprising one or more stages that each include a style block 645 and the demodulation operation is omitted from the output style block 645.

Figure 6F:
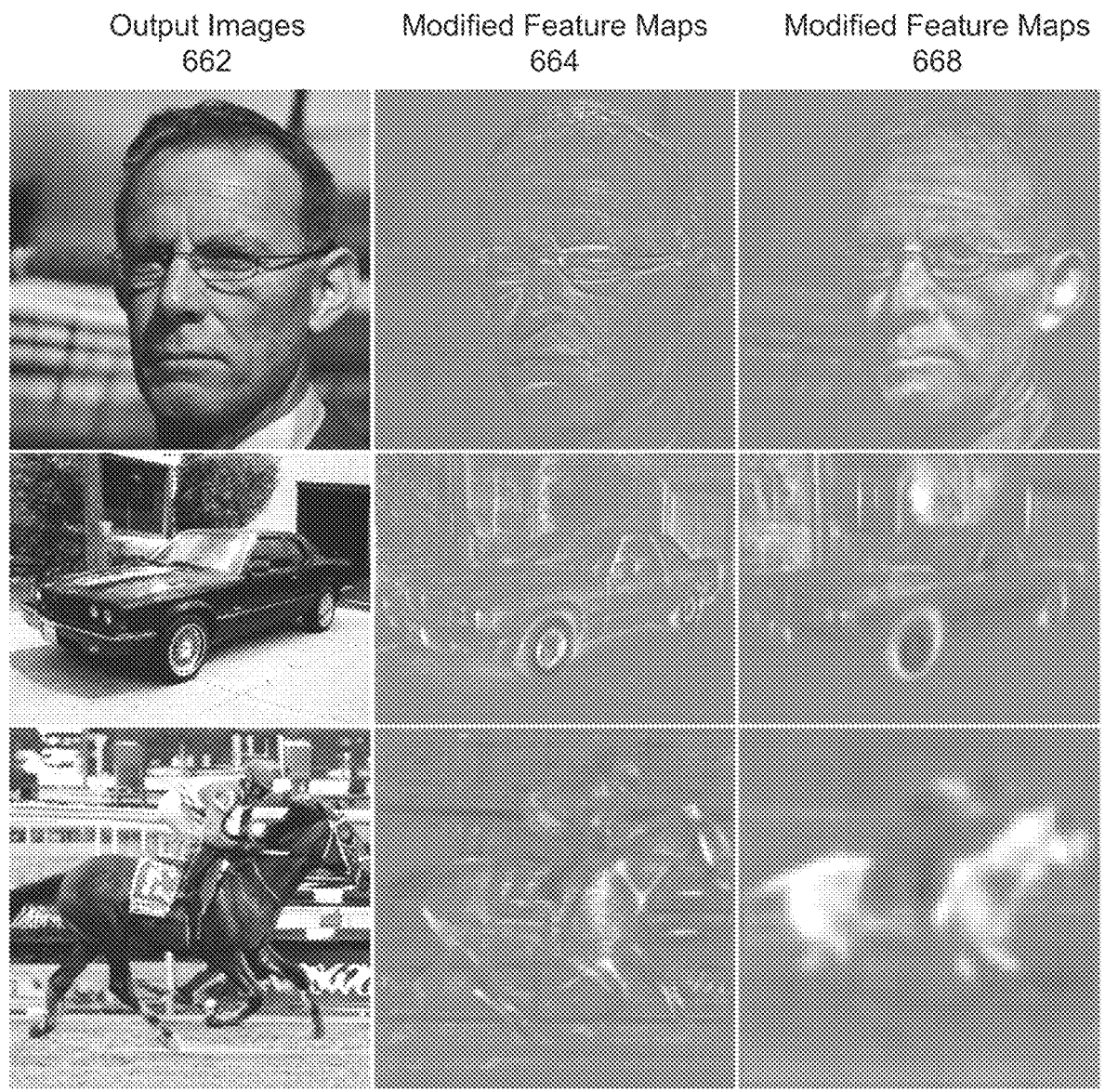
FIG. 6F illustrates images and feature maps generated using demodulated weights, in accordance with an embodiment.

FIG. 6F illustrates output images 662 and modified feature maps 664 and 668 that are generated using weight demodulation, in accordance with an embodiment. Compared with the output images in FIG. 6A, visible artifacts are either missing or are greatly reduced in the output images 662. Similarly, visible artifacts are either missing or are greatly reduced in the modified feature maps 664 and 668 that are produced by style blocks 645 for different scales. The reduction and/or removal of artifacts is achieved while retaining full controllability of styles at different scales. Furthermore, training time may be reduced as a result of a simplified dataflow for modulating and demodulating the weights instead of the feature maps.

Smoothing Regularization for a Generator Neural Network

A smoothness regularization technique may also be used, in combination with or independent of the weight demodulation, to improve quality of output data produced by a generator neural network. Smoothness regularization strives to ensure that small changes in the input to a neural network cause small changes in the output in such a way that the magnitude of the change remains uniform across the space of possible inputs, as well as possible directions of changing the inputs. In other words, small changes in the latent space (or the intermediate latent space that, in turn, change the style signals) should result in small changes in the output space (e.g., images). Achieving a uniform distribution of the changes in the input space and a uniform distribution of corresponding changes in the output space is the goal. The smoothness regularization technique may be used to encourage a smooth transformation between a latent space to the output data, between the first intermediate data and either other intermediate data or the output, between any two intermediate data, or between any intermediate data and the output.

A metric that may be used to measure smoothness may also indicate improved quality in the output data. During training, the metric may be used to adjust the learned parameters of the style-based generator system 100. In particular, weights for the synthesis neural network 140 may be adjusted by smoothness regularization to improve the metric as well as the quality of output data.

Several metrics are available for quantitative analysis of the quality of images produced using generative methods. Frechet inception distance (FID) measures differences in the density of two distributions in the high dimensional feature space of a Inception V3 classifier. Precision and Recall (P&R) provide additional visibility by explicitly quantifying the percentage of generated images that are similar to training data and the percentage of training data that can be generated, respectively. While FID and P&R successfully capture many aspects of a generator, both metrics have somewhat of a blind spot for image quality. FID and P&R are based on classifier networks that have recently been shown to focus on textures rather than shapes, and consequently, these metrics do not accurately capture all aspects of image quality. However, a perceptual path length (PPL) metric, originally introduced as a method for estimating the quality of latent space interpolations, correlates with consistency and stability of shapes. PPL quantifies smoothness of a transformation by estimating the expected path length of a random interpolation path in the intermediate latent space, measured in terms of perceptual changes to the image over the course of interpolation. The PPL metric can be computed for individual images (Per-image PPL) by considering infinitesimally short interpolation paths in the immediate vicinity of a given image. In an embodiment, the synthesis neural network 140 may be trained based on the PPL metric to favor smooth transformations and achieve an improvement in the quality of the output data that is generated.

Figure 7A:
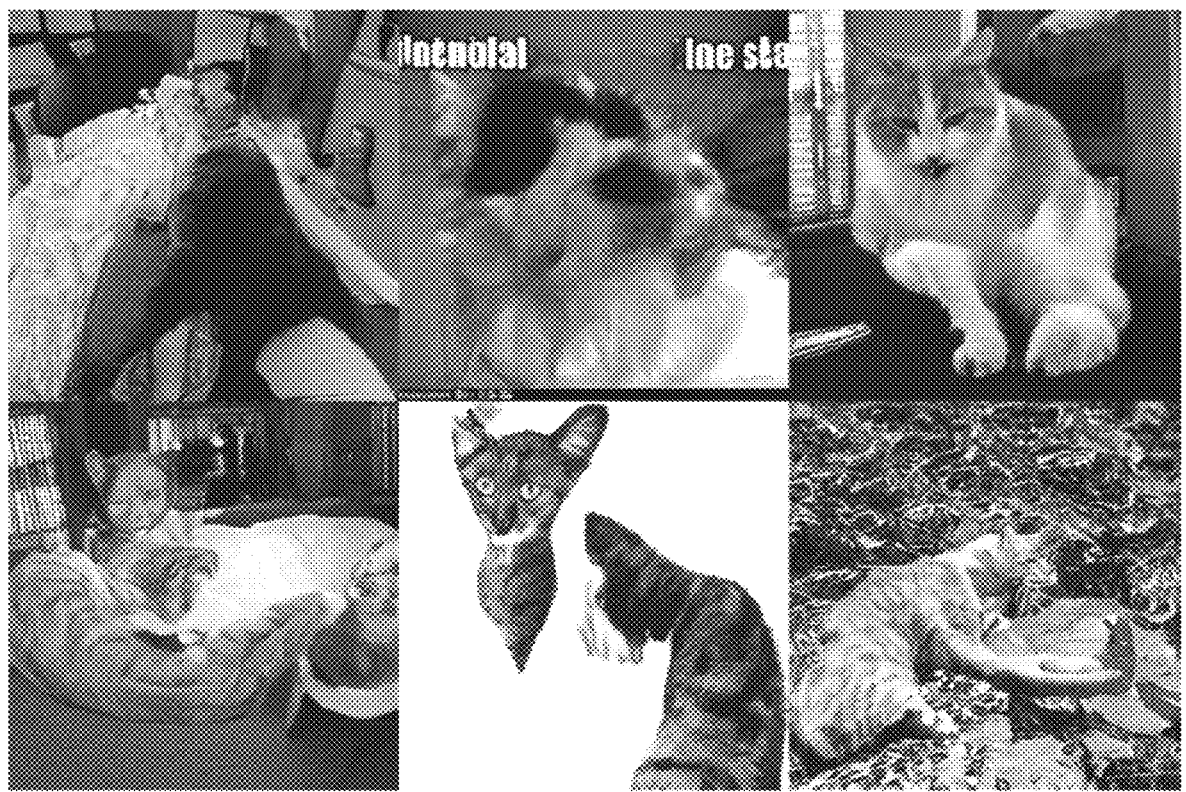
FIG. 7A illustrates images generated by the style-based generator system that have high perceptual path length (PPL) scores, in accordance with an embodiment.

FIG. 7A illustrates images generated by the style-based generator system 100 that have high PPL scores (long interpolation paths), in accordance with an embodiment. The six images each include a cat, but in each image a shape of the cat is distorted and/or discontinuous, sometimes scrambled with other scene elements. In other words, the six images in FIG. 7A lack semantic consistency. The PPL score computed for each of the images in FIG. 7A is in the top $90^{th}$ percentile of a set of random example images generated by the style-based generator system 100.

Figure 7B:
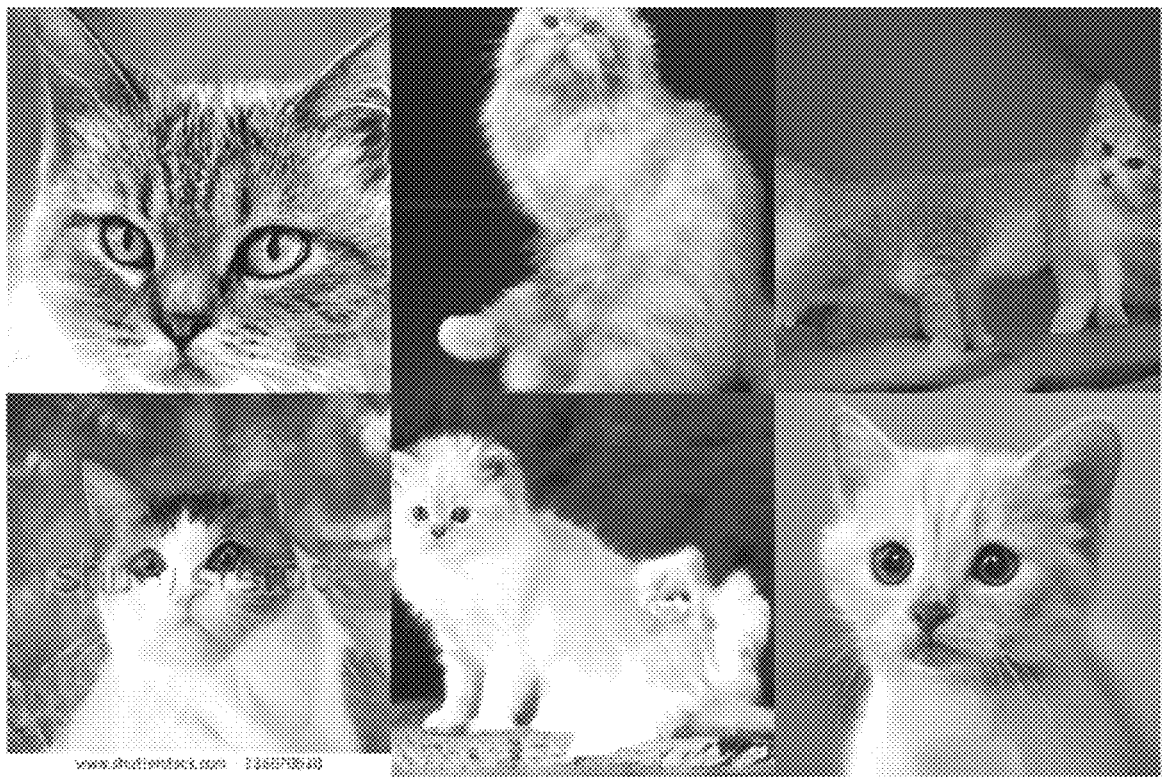
FIG. 7B illustrates images generated using by the style-based generator system that have low PPL scores, in accordance with an embodiment.

FIG. 7B illustrates images generated using by the style-based generator system 100 that have low PPL scores (short interpolation paths), in accordance with an embodiment. The six images in FIG. 7B also each include a cat and each cat appears mostly as expected. None of the cats appear discontinuous or scrambled with other elements of the scene. In other words, the six images in FIG. 7B are generally semantically consistent. The PPL score computed for each of the images in FIG. 7B is in the bottom $10^{th}$ percentile of a set of random example images generated by the style-based generator system 100.

As can be observed by comparing the quality of the images in FIGS. 7A and 7B, there is a correlation between perceived image quality and the computed PPL metric. The PPL metric is computed by measuring average learned perceptual image patch similarity (LPIPS) distances between generated images under small perturbations in latent space. A lower PPL (smoother generator mapping) appears to correlate with higher overall image quality, whereas other metrics lack a correlation with image quality.

In practice, applying smoothness regularization between an intermediate latent code and the output image is highly beneficial considering the quality of the generated images. The benefit of smoothness regularization can be understood by comparing the distribution of per-image PPL scores for the style-based generator system 100 trained with and without smoothness regularization.

Figure 7C:
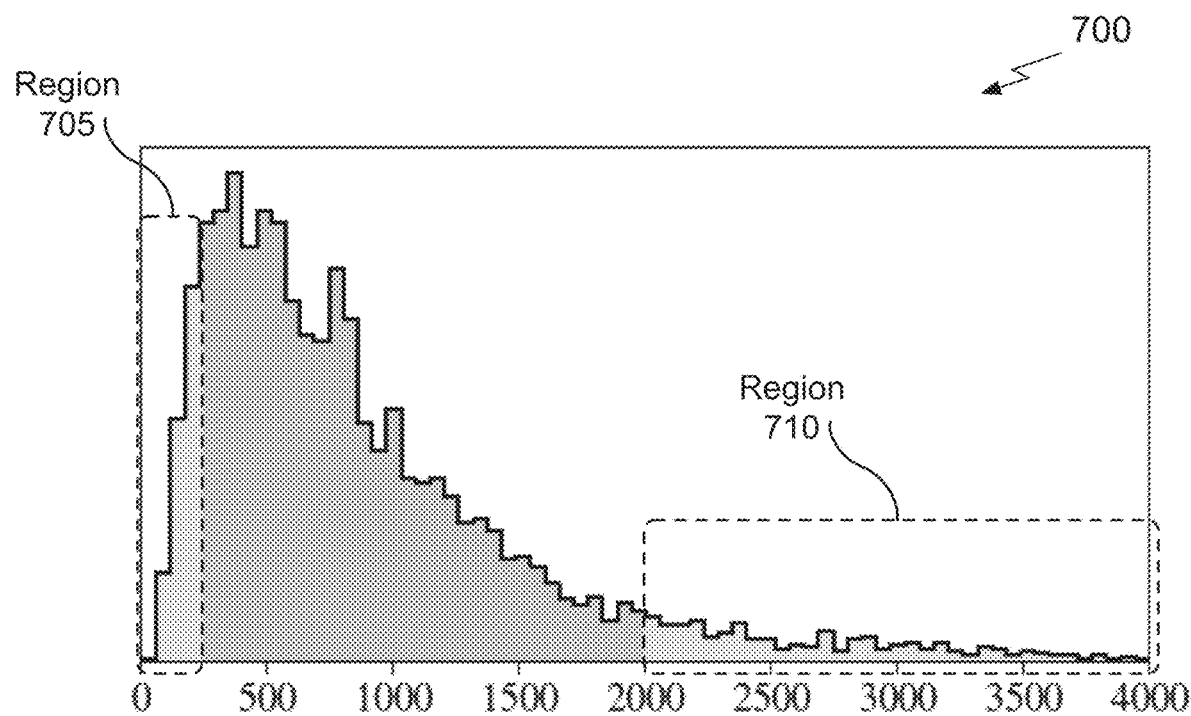
FIG. 7C illustrates a graph of the PPL scores for a set of images, in accordance with an embodiment.

FIG. 7C illustrates a graph of the PPL scores 700 for a set of images, in accordance with an embodiment. The images are generated by changing the input latent code or the intermediate latent code by a small amount to produce each new image. In other words, a small movement in the intermediate latent space should correspond to a small change in the output data. The set of images may include the images shown in FIGS. 7A and 7B. PPL scores in a region 705 of the distribution are low PPL scores corresponding to high-quality images, including the images shown in FIG. 7B. PPL scores in a region 710 of the distribution are high PPL scores corresponding to low-quality images, including the images shown in FIG. 7A. An image in the region 710 exhibits a large and/or discontinuous change relative to the change in the input latent code that produced the image. In other words, in response to a small change in the latent code, the image changes abruptly rather than smoothly compared with the previous image. The images are generated by the style-based generator system 100 using different random seed values as input and path lengths are computed based on path endpoints in W.

Figure 7D:
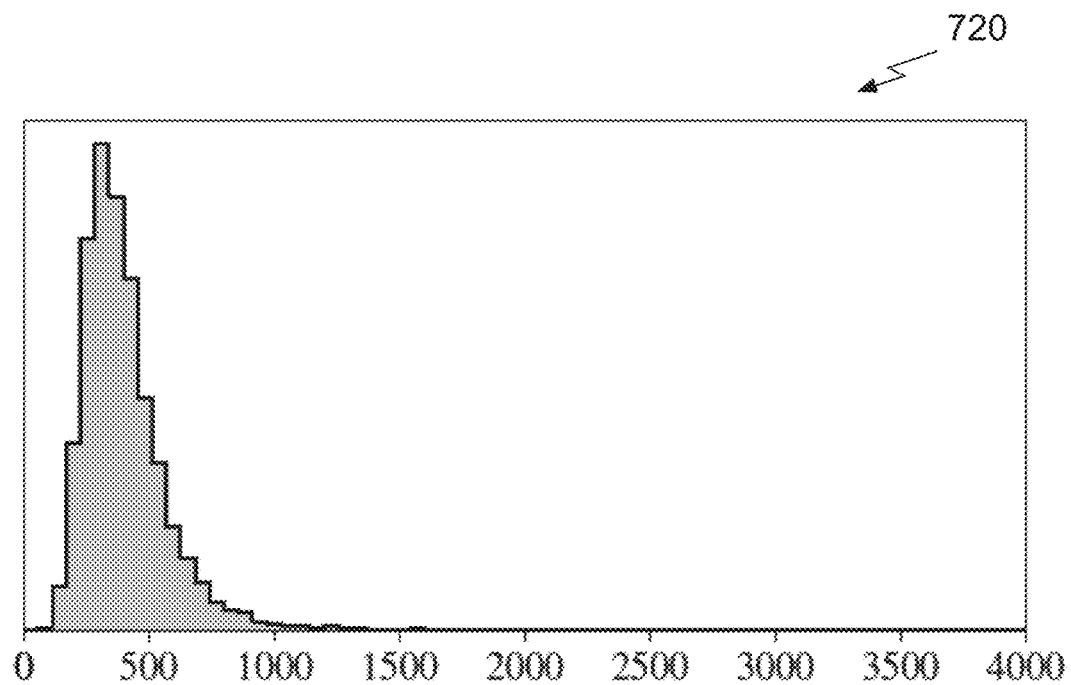
FIG. 7D illustrates a graph of PPL scores for a set of images generated when smoothing regularization is used, in accordance with an embodiment.

FIG. 7D illustrates a distribution of PPL scores 720 for a set of images generated when smoothing regularization is used, in accordance with an embodiment. In an embodiment, the smoothing regularization technique is applied to the style-based generator system 100 during training. The mapping neural network 110 receives an input latent code and produces an intermediate latent code. The synthesis neural network 140, in turn, receives the intermediate latent code and produces an output image. Specifically, smoothing regularization is applied between the intermediate latent code and the output image to ensure that the transformation between the intermediate latent code and the output image is smooth. In an embodiment, smoothing regularization is applied between one of the style signals and the output data. The average FID computed for the images associated with the distribution of PPL scores 700 and 720 are equal. However, the average PPL scores are quite different and the tail of the distribution within region 710 of the distribution of PPL scores 700 is missing in the distribution of PPL scores 720.

It is not immediately obvious why a low PPL should correlate with image quality. Perhaps, during training, as the discriminator 275 penalizes broken images, the most direct way for the style-based generator system 100 to improve is to effectively stretch the region of latent space that yields good images. As a result, the low-quality images may be squeezed into small latent space regions of rapid change. While the stretching and squeezing of different latent space regions may improve the average output quality in the short term, the accumulating distortions impair the training dynamics and consequently the final image quality. The empirical correlation between lower PPL and increased output quality suggests that favoring a smooth generator mapping by encouraging low PPL during training may improve image quality.

Excess path distortion in the style-based generator system 100 is evident as poor local conditioning: any small region in the intermediate latent space $\mathcal{W}$ becomes arbitrarily squeezed and stretched as the style-based generator system 100 is trained. A generator mapping from the latent space to image space is considered to be well-conditioned if, at each point in latent space, small displacements yield changes of equal magnitude in image space, regardless of the direction of perturbation. The small displacements may be applied in the latent space to produce corresponding changes of equal magnitude in the image space or the small displacements may be applied in the image space to produce corresponding changes of equal magnitude in the latent space.

The synthesis neural network 140 shown in FIG. 2B includes a sequence of processing blocks 200 and 230 that each generate intermediate data (activations). Regularization may be applied to the synthesis neural network 140 to ensure the transformation between the intermediate latent code and the output image is smooth. Alternatively, regularization may be applied between any two corresponding points in the synthesis neural network 140. For example, the relationship between outputs (e.g., output features or modified features) from any pair of the style blocks 645 can be regularized. The final style block 645 generates the output image. Alternatively, regularization can be applied to other generator neural network architectures. In an embodiment, to balance the computational expense of regularization, regularization may be performed less frequently without necessarily compromising effectiveness.

Figure 7E:
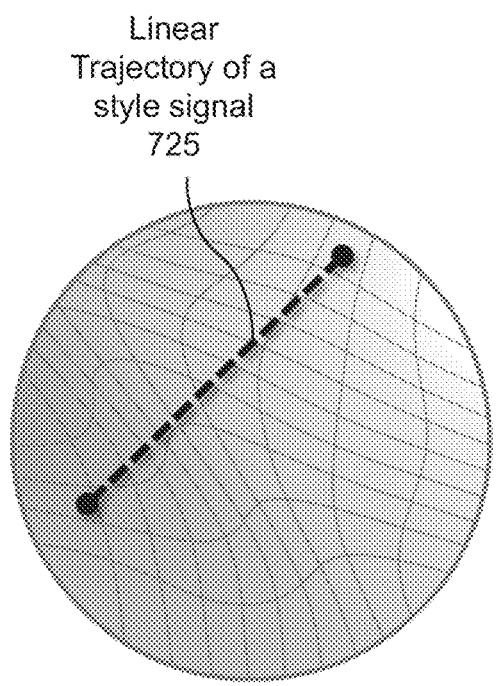
FIG. 7E illustrates a conceptual diagram of paths without regularization, in accordance with an embodiment.
Figure 7E:
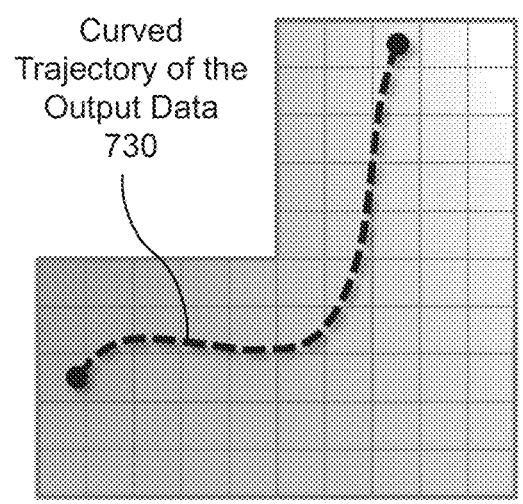

FIG. 7E illustrates a conceptual diagram of paths without regularization, in accordance with an embodiment. A linear trajectory of a style signal 725 is produced by changing the style signal repeatedly by the same magnitude. In response, the synthesis neural network 140 produces a curved trajectory of the output data 730. The curved trajectory results from changes in the output data that have varying magnitude compared with the changes of equal magnitude in the style signal.

Figure 7F:
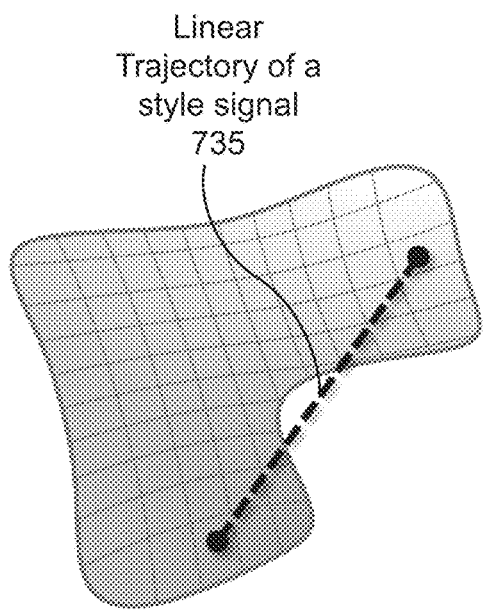
FIG. 7F illustrates a conceptual diagram of paths with regularization, in accordance with an embodiment.
Figure 7F:
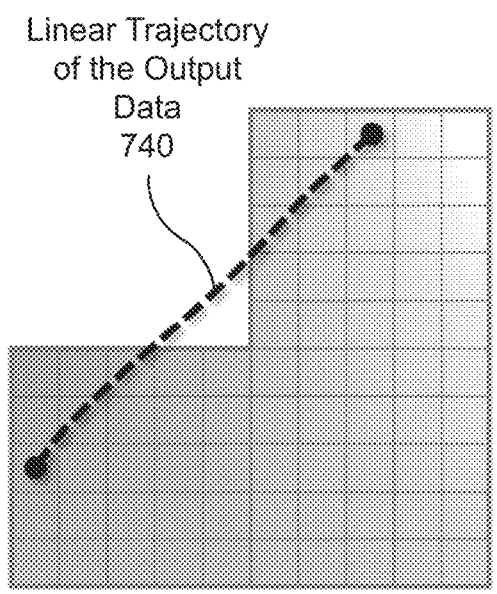

FIG. 7F illustrates a conceptual diagram of paths with regularization, in accordance with an embodiment. The mapping network 110 is trained to map a latent code into an intermediate latent space and generate a style signal. The mapping shown in FIG. 7F is more uniform compared with the mapping shown in FIG. 7E. A linear trajectory of a style signal 735 is produced by changing the style signal repeatedly by the same magnitude. In response, the synthesis neural network 140 produces a nearly linear trajectory of the output data 740 having changes of the same magnitude. A change in the style signal of a first magnitude produces a corresponding change in the output data of a similar magnitude.

Figure 8A:
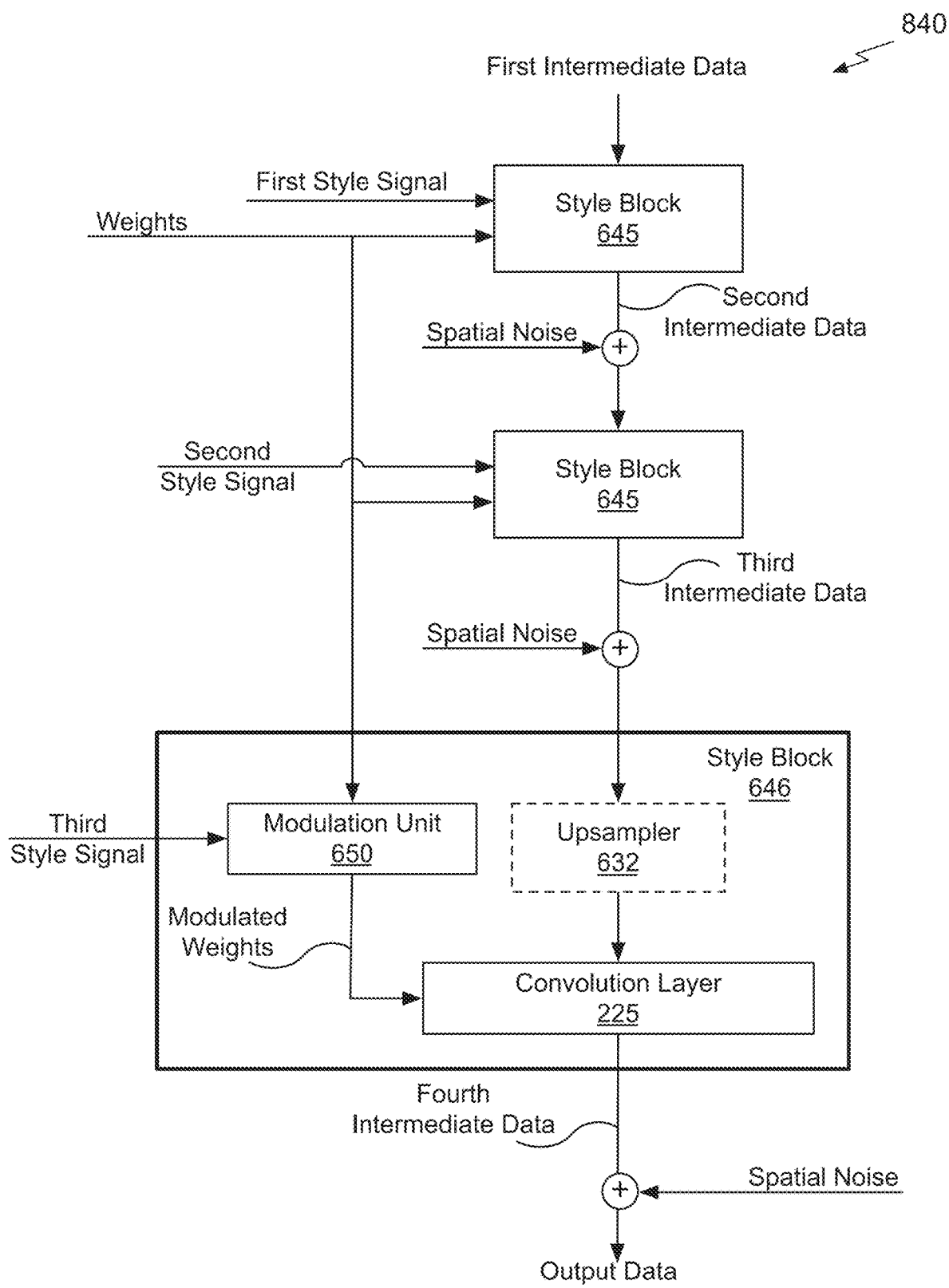
FIG. 8A illustrates a block diagram of a synthesis neural network implemented using the style block of FIG. 6D, for use in implementing some embodiments of the present disclosure.

FIG. 8A illustrates a block diagram of a synthesis neural network 840 implemented using the style block 645 of FIG. 6D, for use in implementing some embodiments of the present disclosure. The synthesis neural network 840 includes a sequence of style blocks 645 and a style block 646. Compared with the style blocks 645, the demodulation unit 640 is omitted from the style block 646 because it is the last style block in the synthesis neural network 840. The first style block 645 receives the first intermediate data, first style signal, and at least a portion of the weights in a set of weights. The weights are processed according to the first style signal and applied to the first intermediate data to produce second intermediate data. The second intermediate data includes content encoded in the first intermediate data that is modified based on the first style signal. Spatial noise and/or a bias (not shown) may be inserted into the second intermediate data.

The second style block 645, receives the second intermediate data, second style signal, and at least another portion of the weights in the set of weights. The weights are processed according to the second style signal and applied to the second intermediate data to produce third intermediate data. The third intermediate data includes content encoded in the first intermediate data that is modified based on the first style signal and the second style signal. In an embodiment, the first and second style signals operate at different scales. Thus, the style modifications resulting from the first style signal are retained in the third intermediate data. In other embodiments, one or more additional style blocks 645 may be included between the second style block 645 and the style block 646. In another embodiment, the second style block 645 is omitted and the style block 646 receives the second intermediate data. Spatial noise and/or a bias (not shown) may be inserted into the third intermediate data.

The style block 646, receives the third intermediate data, third style signal, and at least another portion of the weights in the set of weights. The weights are processed according to the third style signal and applied to the third intermediate data to produce fourth intermediate data. The fourth intermediate data includes content encoded in the first intermediate data that is modified based on the first style signal, the second style signal, and the third style signal. In an embodiment, the first, second, and third style signals operate at different scales. Thus, the style modifications resulting from the first and second style signals are retained in the fourth intermediate data. Spatial noise and/or a bias (not shown) may be inserted into the fourth intermediate data to produce the output data.

Figure 8B:
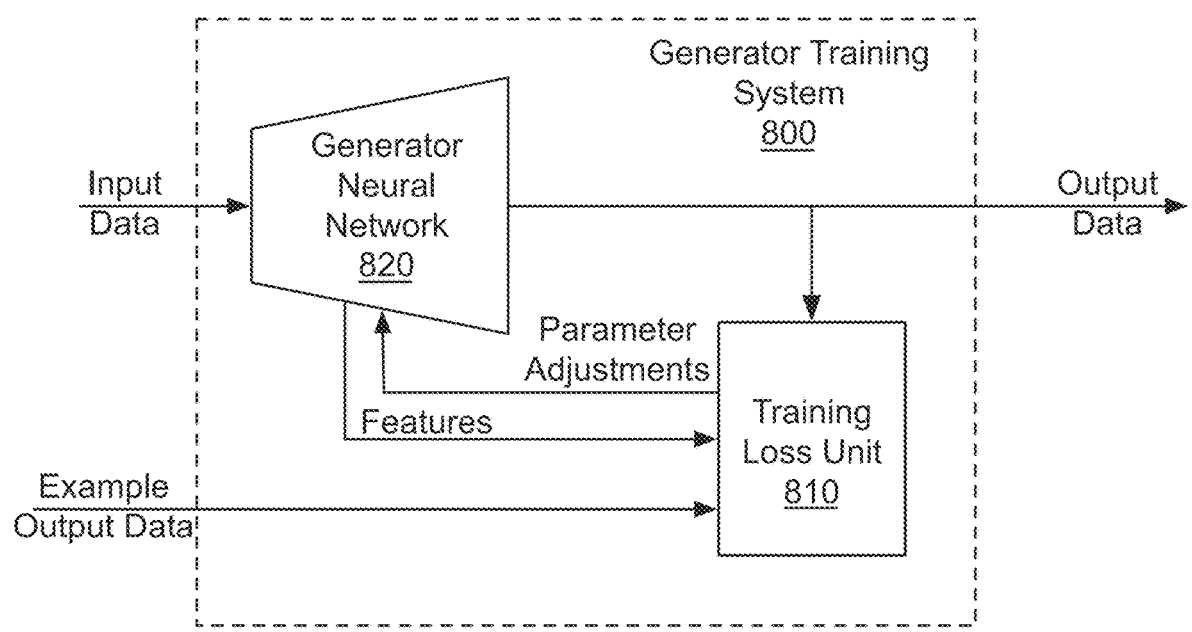
FIG. 8B illustrates a block diagram of a generator neural network training system, in accordance with an embodiment.

FIG. 8B illustrates a block diagram of a generator training system 800, in accordance with an embodiment. The generator training system 800 may be implemented by a program, custom circuitry, or by a combination of custom circuitry and a program. For example, the generator training system 800 may be implemented using a GPU, CPU, or any processor capable of performing the operations described herein. Furthermore, persons of ordinary skill in the art will understand that any system that performs the operations of the generator training system 800 is within the scope and spirit of embodiments of the present invention.

The generator training system 800 includes a generator neural network 820, such as the style-based generator system 100 including the synthesis neural network 140 or 840, and a training loss unit 810. The generator neural network 820 receives input data (e.g., at least one latent code and/or noise inputs) and produces output data. Depending on the task, the output data may be an image, audio, video, or other types of data (configuration setting). The generator neural network 820 may be using a training dataset that includes example output data that the output data produced by the generator neural network 820 should be consistent with. The generator neural network 820 generates output data in response to the input data and the training loss unit 810 determines if the output data appears similar to the example output data included in the training data. Based on the determination, a set of parameters of the generator neural network 820 are adjusted.

When regularization is performed, the training loss unit 810 is configured to identify two points within the generator neural network 820 and apply a first modification to a first point and compute a second modification for a second point.

The second modification is consistent with the first modification and a regularization loss is computed based on the second modification. The set of parameters used by the generator neural network are then updated to reduce the regularization loss. In an embodiment, the two points may include intermediate data and the output data. In an embodiment, the two points may include a style signal and either intermediate data or the output data.

In an embodiment, a finite difference technique is used to compute the second modification by applying the first modification to the style signal or intermediate data at the first point and processing the first modified style signal or intermediate data by the subsequent layers of the generator neural network 820 to produce the second modification in the intermediate data or output data the second point. In an embodiment, the first modification is a small random amount.

In an embodiment, a forward differentiation technique is used to compute the second modification by differentiating the intermediate data or output data at the second point with respect to a linear trajectory of the style signal or intermediate data at the first point, where the linear transformation is defined by the first modification. In an embodiment, the linear trajectory is randomly selected.

Another smoothing regularization technique changes the output data to rather than modifying the intermediate data or a style signal and propagating the modification forward through the generator neural network 820. In an embodiment, the backward differentiation technique is used to compute the second modification by reversing the first and second points, so that the first point is downstream (in terms of processing in the generator neural network 820) relative to the second point. For the backward differentiation, an inner product (e.g., dot product) is computed between the intermediate data or output data at the first point and the first modification and the inner product is differentiated with respect to the style signal or intermediate data at the second point to compute the second modification. For example, in an embodiment, a gradient vector may be computed as a dot product between the output data and a random vector, differentiated with respect to the intermediate data or style signal.

The regularization is performed by repeatedly computing the second modification when the synthesis neural network 840 is being trained, and then penalizing deviations in the magnitudes of the second modification compared with a reference value. The set of parameters (e.g., weights) are adjusted based on the deviations to increase uniformity of the magnitudes. The first point may correspond to the first style signal, second style signal, third style signal, first intermediate data, second intermediate data, or the third intermediate data. The second point may correspond to the second intermediate data, the third intermediate data, the fourth intermediate data, or the output data. When backward differentiation is used, the correspondences of the first and second points are reversed.

Figure 8C:
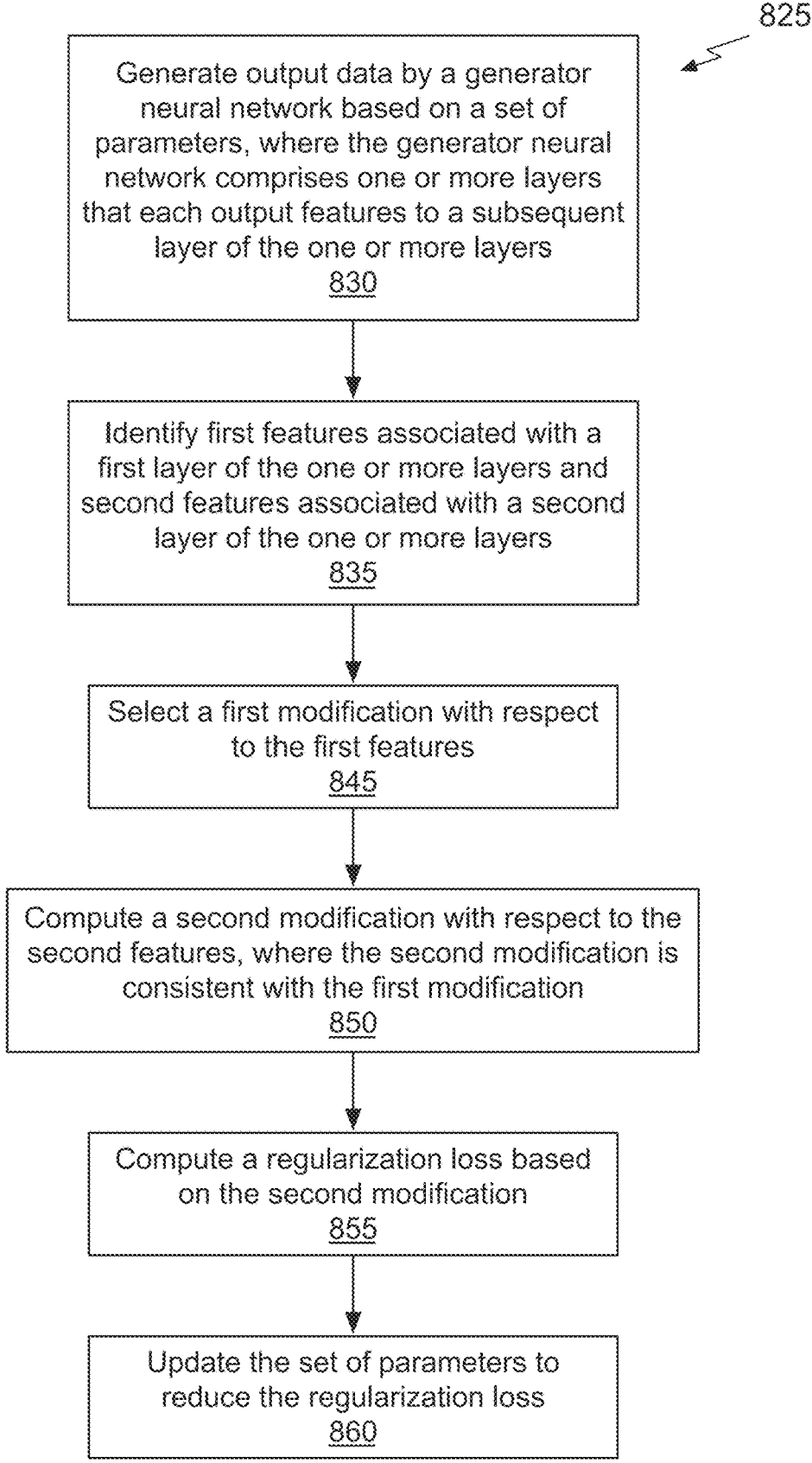
FIG. 8C illustrates a flowchart of a method for smoothing regularization for use in a generator neural network, in accordance with an embodiment.

FIG. 8C illustrates a flowchart of a method 825 for smoothing regularization for use in a generator neural network, in accordance with an embodiment. Each block of method 825, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (stand- alone or in combination with another hosted service), or a plug-in to another product, to name a few. In addition, method 825 is described, by way of example, with respect to the generator neural network 820 of FIG. 8B. However, this method may additionally or alternatively be executed by any one system, or any combination of systems, including, but not limited to, those described herein. Furthermore, persons of ordinary skill in the art will understand that any system that performs method 825 is within the scope and spirit of embodiments of the present disclosure.

At step 830, output data is generated by a generator neural network based on a set of parameters, where the generator neural network comprises one or more layers that each output features to a subsequent layer of the one or more layers. In an embodiment, the generator neural network comprises one or more layers that each comprise a first layer 120, a second layer 130, processing blocks 200 or 230, and/or style block 600, 640, 645, or 646. In an embodiment, the generator neural network includes the synthesis neural network 140 or 840. In an embodiment, generating the output data comprises computing the second features before computing the first features. In an embodiment, the first features are the output data and the second features are a style signal or intermediate data, so that the regularization is performed using backward differentiation.

At step 835, first features associated with a first layer of the one or more layers and second features associated with a second layer of the one or more layers are identified. In an embodiment, the first features are one of a style signal, intermediate data, and output data. In an embodiment, the second features are one of a style signal, intermediate data, and output data.

At step 845, a first modification is selected with respect to the first features. In an embodiment, the first modification causes a change in the first features. In an embodiment, selecting the first modification comprises selecting each component of the first modification randomly to produce a Gaussian distribution of the first modifications.

At step 850, a second modification is computed with respect to the second features, where the second modification is consistent with the first modification. In an embodiment, computing the second modification comprises modifying the first features (e.g., style signal or intermediate data) according to the first modification to yield modified first features, re-computing the second features based on the modified first features to yield modified second features (e.g., downstream intermediate data or the output data), and computing the second modification as the difference between the second features and modified second features. In an embodiment, re-computing the second features comprises processing the modified first features by one or more layers of the generator neural network to produce the modified second features.

When backward differentiation is used to perform regularization, the second modification may be computed by computing an inner product between the first features (e.g., downstream intermediate data or the output data) and the first modification and then differentiating the inner product with respect to the second modification.

At step 855, a regularization loss is computed based on the second modification. In an embodiment, the regularization loss is computed by the training loss unit 810. In an embodiment, the regularization loss comprises a magnitude of the second modification. In an embodiment, the regularization loss comprises an $L^2$ norm function. In an embodiment, the regularization loss is computed by comparing a magnitude of the second modification against a reference value. In an embodiment, the reference value is a constant. In another embodiment, the reference value is computed as an average of the magnitudes over several executions of the generator neural network.

At step 860, the set of parameters is updated to reduce the regularization loss. In an embodiment, the set of parameters are weights, where different portions of the weights are applied to the activations by the different layers in the generator neural network. In an embodiment, updating the set of parameters brings the magnitude closer to the reference value.

At a single point in the intermediate latent space, $w \in \mathcal{W}$, the local metric scaling properties of the generator mapping $g(w): \mathcal{W} \mapsto \mathcal{Y}$ are captured by the Jacobian matrix $J_w = \partial g(w)/\partial w$. The point in the intermediate latent space may be the first features identified at step 840 and may comprise a style signal or intermediate data associated with a layer of the generator. Motivated by the desire to preserve the expected lengths of vectors regardless of the direction, a regularizer function for performing backward differentiation may be formulated as $$\mathbb{E}_{w, y \sim \mathcal{N}(0, \mathbf{I})} (|J_w^T y|_2 - \alpha)^2,  \qquad \text{Eq. (5)}$$

where $\alpha$ is a reference value, y are modifications such as random images with normally distributed pixel intensities, and $w \sim f(z)$, where the latent vectors in latent space z are normally distributed. The random images may be generated by the style-based generator system 100 using a random latent code to produce an initial image. A set of random per-pixel Gaussian noise images may be used to define a set of modifications to the initial image. The noise images need not be used to actually modify the initial image.

To avoid explicit computation of the Jacobian matrix, the identity $J_w^T y = \nabla_w (g(w) \cdot y)$, which is efficiently computable using standard backpropagation may be used. $J_w^T y$ comprises a second modification, corresponding to a modification of the style signal or intermediate data as a result of adding random noise y to the initial image $g(w)$. In an embodiment, a is a constant that is set dynamically during optimization as the long-running exponential moving average of the lengths of a magnitude of the second modification $|J_w^T y|_2$, allowing the optimization to find a suitable global scale by itself. In an embodiment, the second modifications, products $J_w^T y$ are computed analytically. Equation (5) is minimized when $J_w$ is orthogonal (up to a global scale) at any w. An orthogonal matrix preserves lengths and introduces no squeezing along any dimension. Thus, the orthogonal matrix is associated with a uniform space.

Changes in the initial image $g(w)$ resulting from the modification (e.g., noise images) are computed as a dot product between the image and each noise image y in the set of noise images, $g(w) \cdot y$. Assuming that the initial image is modified based on each noise image, the dot product indicates how quickly the initial image moves in the direction of the noise image. The noise image defines changes in the image space. A direction of each change may be determined by computing a difference gradient ($\nabla_w$) of the dot product with respect to the intermediate latent code w that is used to generate the style signals. The direction indicates the direction in which movement should occur in the intermediate latent space to maximize changes in the modified image. The length (magnitude) of the difference gradient indicates speed of the change in the image with respect to the noise image for corresponding changes in the latent space (e.g., second modifications) that are in the direction of the difference gradient.

As shown in Equation (5), a magnitude of the second modification (difference gradient length) is compared with the reference length (a) and the square of the difference is a regularization penalty for a particular choice of w and y that is computed during training. The difference gradients should converge toward being equal in length, thereby indicating that the transformation between the spaces is more uniform. During training, variations in the difference gradient lengths may be penalized through a loss function to perform the smoothing regularization. When the regularization process is repeated for multiple choices of w and y during training of the style-based generator system 100 or the generator neural network 820, Equation (5) computes the average of the regularization penalty over the multiple choices that is minimized.

As the difference gradient $\nabla_w (g(w) \cdot y)$, is somewhat expensive to compute, a general optimization that applies to all regularization techniques may be used. Typically, the main loss function (e.g., logistic loss) and regularization terms (e.g., $R_1$) are written as a single expression and are thus optimized simultaneously. However, the regularization terms can be computed much less frequently than the main loss function, thus greatly diminishing their computational cost and the overall memory usage. For example, the $R_1$ regularization may be performed only once every 16 mini-batches without any drawback. Furthermore, training performance may also be improved as a result of less frequent computation of regularization terms. In an embodiment, training with reduced frequency of the computation for a generator neural network that implements weight demodulation is performed 40% faster at 61 images/sec compared with 37 images/sec implemented without weight demodulation and regularization.

Image quality issues, such as the artifacts 601, 603, and 605 shown in FIG. 6A, have been identified and restructuring the synthesis neural network to implement weight demodulation improves the quality. The weight demodulation may also be applied to other generator neural networks. Additionally, regularizing smoothness between intermediate data output by two different layers (or stages) or between intermediate data and the output image reduces image artifacts, such as the artifacts illustrated in images 7A. The regularization technique may be used in combination with weight demodulation or separately to improve the performance of a generator neural network.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method, comprising:
   generating output data by a generator neural network based on a set of parameters, wherein the generator neural network comprises one or more layers that each output features to a subsequent layer of the one or more layers;
   identifying first features associated with a first layer of the one or more layers and second features associated with a second layer of the one or more layers;
   selecting a first modification with respect to the first features;
   computing a second modification with respect to the second features, wherein the second modification is consistent with the first modification and computing the second modification comprises;
   modifying the first features according to the first modification to yield modified first features;
   re-computing the second features based on the modified first features to yield modified second features; and
   computing the second modification as the difference between the second features and modified second features;
   computing a regularization loss based on the second modification; and
   updating the set of parameters to reduce the regularization loss.

2. The computer-implemented method of claim 1, wherein selecting the first modification comprises selecting each component of the first modification randomly.

3. The computer-implemented method of claim 1, wherein the first modification is selected from a Gaussian distribution of random values.

4. The computer-implemented method of claim 1, wherein the generator neural network is a style-based generator neural network.

5. The computer-implemented method of claim 4, wherein the first features are the output data and the second features are a style signal.

6. The computer-implemented method of claim 4, wherein the first features are intermediate data and the second features are a style signal.

7. The computer-implemented method of claim 1, wherein computing the regularization loss comprises computing a magnitude of the second modification.

8. The computer-implemented method of claim 7, wherein computing the regularization loss further comprises comparing the magnitude against a reference value.

9. The computer-implemented method of claim 8, wherein the reference value is a constant.

10. The computer-implemented method of claim 8, further comprising computing the reference value as an average of the magnitude and additional magnitudes over several executions of the generator neural network.

11. The computer-implemented method of claim 8, wherein updating the set of parameters brings the magnitude closer to the reference value.

12. The computer-implemented method of claim 1, wherein at least one of the steps of generating, identifying, selecting, computing the second modification, computing the regularization loss, or updating is performed within a cloud computing environment.

13. The computer-implemented method of claim 1, wherein at least one of the steps of generating, identifying, selecting, computing the second modification, computing the regularization loss, or updating is performed on a server or in a data center to generate an image, and the image is streamed to a user device.

14. The computer-implemented method of claim 1, wherein at least one of the steps of generating, identifying, selecting, computing the second modification, computing the regularization loss, or updating is performed to generate an image used for training, testing, or certifying a neural network employed in a machine, robot, or autonomous vehicle.

15. A computer-implemented method, comprising:
    generating output data by a generator neural network based on a set of parameters, wherein the generator neural network comprises one or more layers that each output features to a subsequent layer of the one or more layers;
    identifying first features associated with a first layer of the one or more layers and second features associated with a second layer of the one or more layers, wherein generating the output data by the generator neural network comprises computing the second features before computing the first features;

selecting a first modification with respect to the first features;

computing a second modification with respect to the second features, wherein the second modification is consistent with the first modification;

computing a regularization loss based on the second modification; and updating the set of parameters to reduce the regularization loss.

16. The computer-implemented method of claim 15, wherein computing the second modification comprises:

computing an inner product between the first features and the first modification; and differentiating the inner product with respect to the second modification.

17. A system, comprising:

a processor configured to implement a generator neural network comprising one or more layers that each output features to a subsequent layer of the one or more layers, wherein the generator neural network is configured to:

generate output data based on a set of parameters;

identify first features associated with a first layer of the one or more layers and second features associated with a second layer of the one or more layers;

select a first modification with respect to the first features;

compute a second modification with respect to the second features, wherein the second modification is consistent with the first modification and computing the second modification comprises:

modifying the first features according to the first modification to yield modified first features;

re-computing the second features based on the modified first features to yield modified second features; and computing the second modification as the difference between the second features and modified second features;

compute a regularization loss based on the second modification; and update the set of parameters to reduce the regularization loss.

18. The system of claim 17, wherein selecting the first modification comprises selecting each component of the first modification randomly.

19. A non-transitory computer-readable media storing computer instructions that, when executed by one or more processors, cause the one or more processors to perform the steps of:

generating output data by a generator neural network based on a set of parameters, wherein the generator neural network comprises one or more layers that each output features to a subsequent layer of the one or more layers;

identifying first features associated with a first layer of the one or more layers and second features associated with a second layer of the one or more layers;

selecting a first modification with respect to the first features;

computing a second modification with respect to the second features, wherein the second modification is consistent with the first modification and computing the second modification comprises:

modifying the first features according to the first modification to yield modified first features;

re-computing the second features based on the modified first features to yield modified second features; and computing the second modification as the difference between the second features and modified second features;

computing a regularization loss based on the second modification; and updating the set of parameters to reduce the regularization loss.

20. The non-transitory computer-readable media of claim 19, wherein selecting the first modification comprises selecting each component of the first modification randomly.

* * * * *